June 11, 1963   F. C. ALPERS ET AL   3,093,821
CONTROL SYSTEM FOR HOMING GUIDED MISSILE
Filed July 1, 1952   9 Sheets-Sheet 1
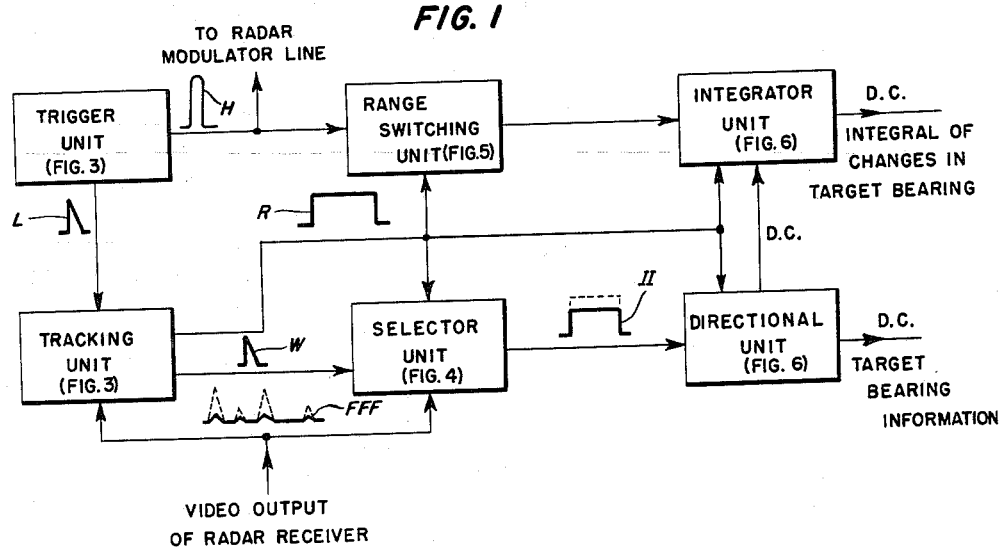
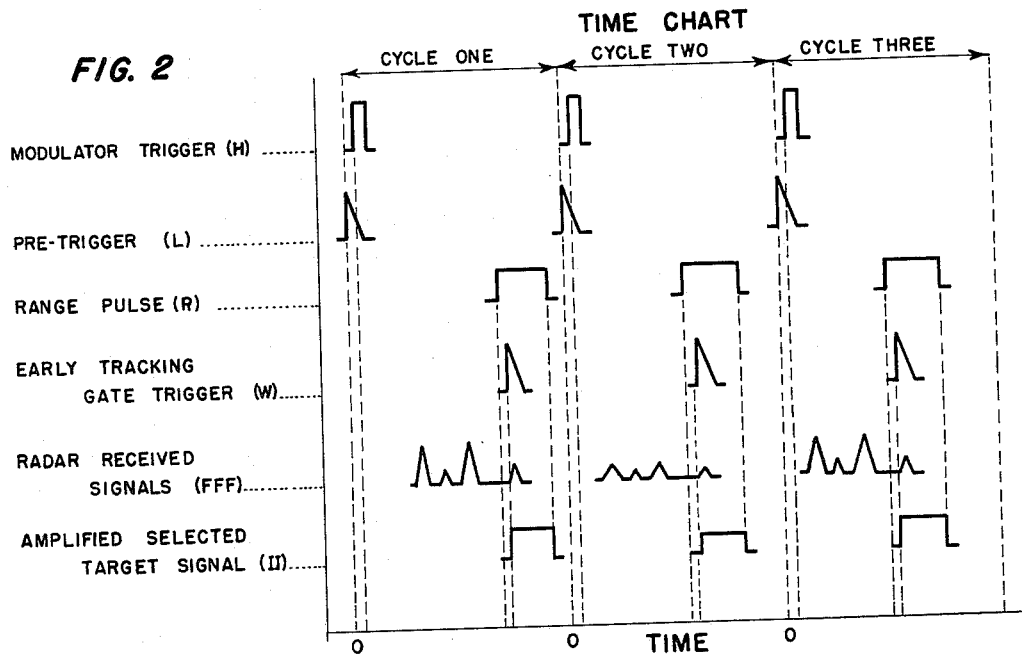
INVENTORS
FREDERICK C. ALPERS
FRED S. ATCHISON
WILFRID A. YATES
BY
ATTORNEYS

INVENTORS
FREDERICK C. ALPERS
FRED S. ATCHISON
WILFRID A. YATES
BY
ATTORNEYS

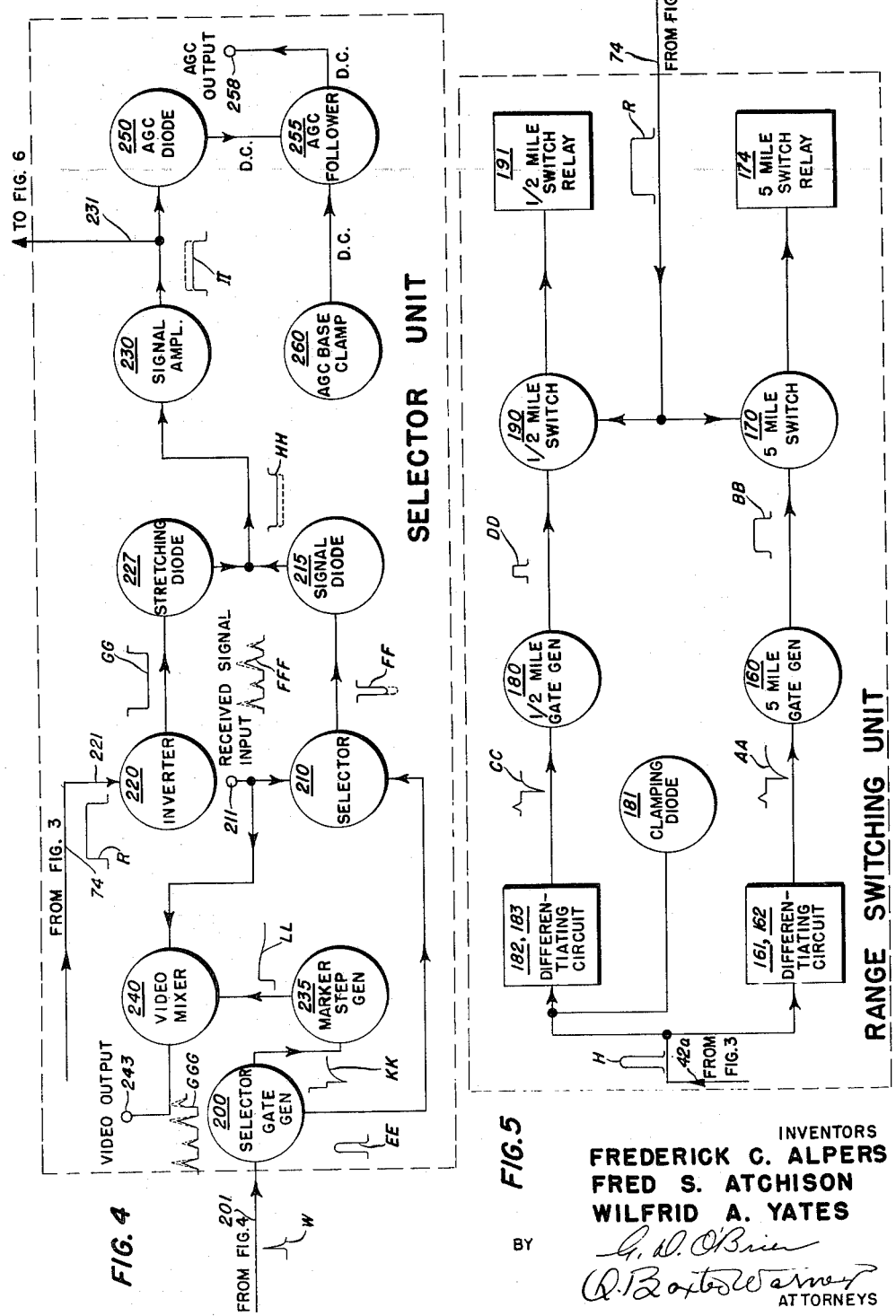

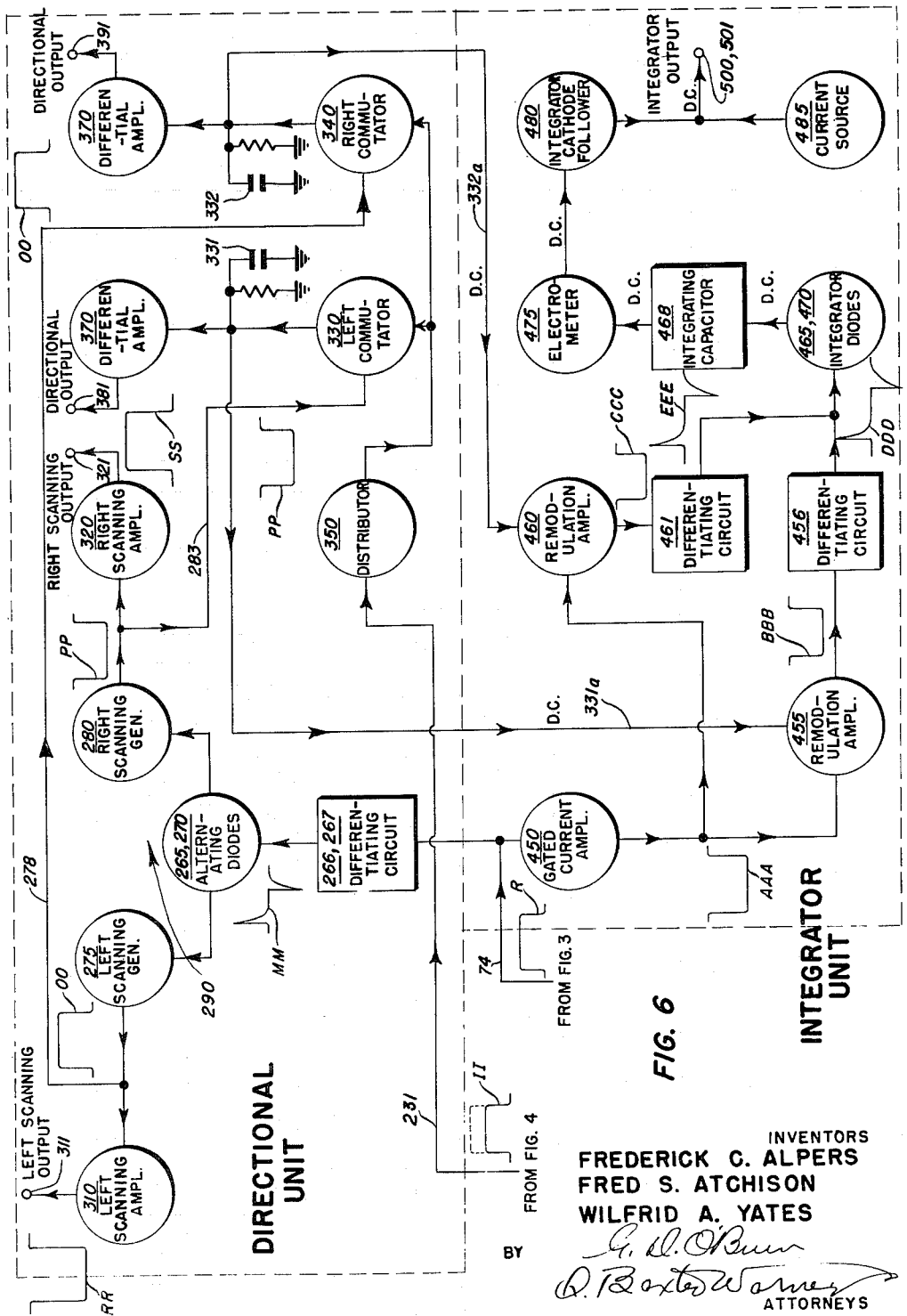

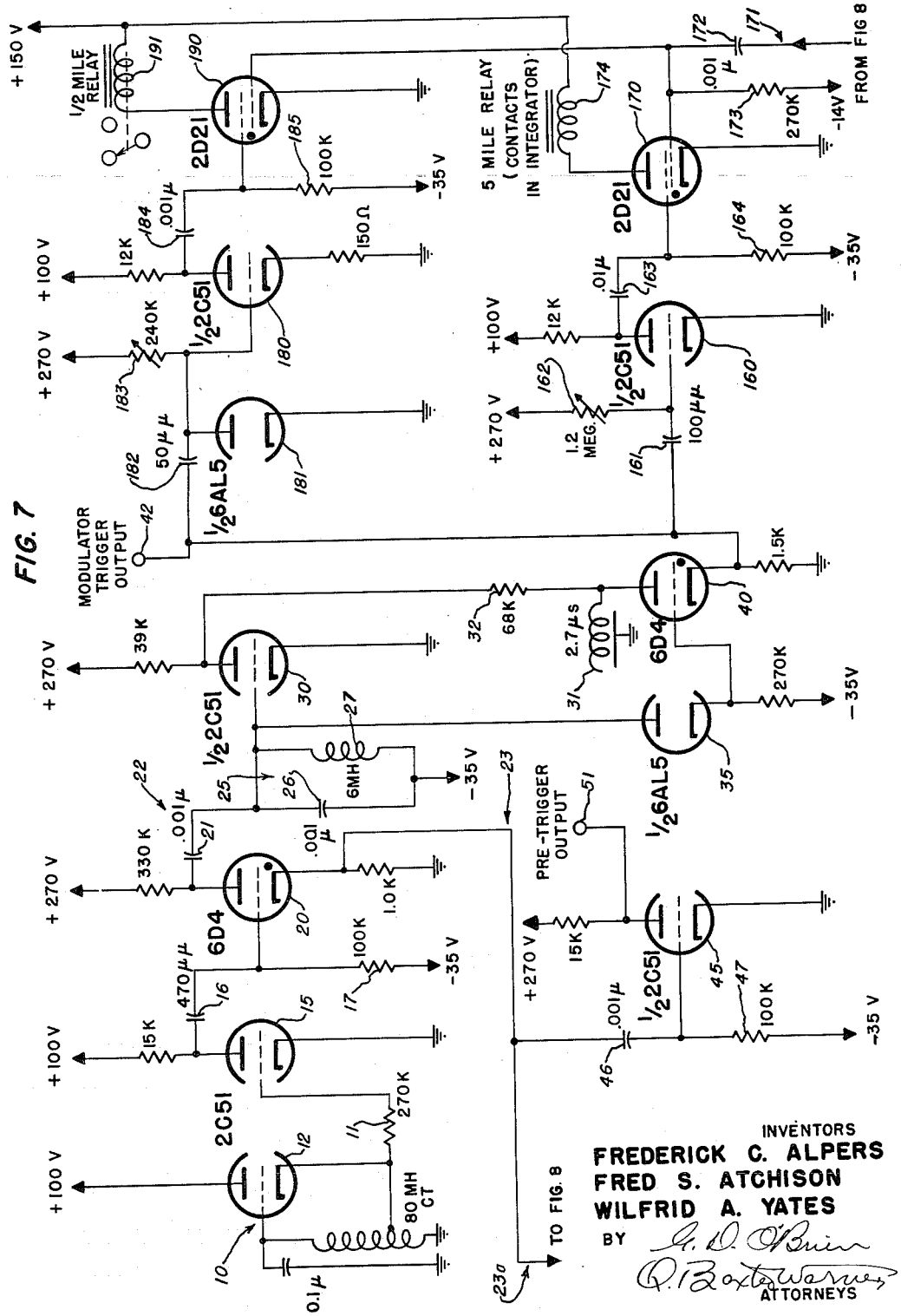

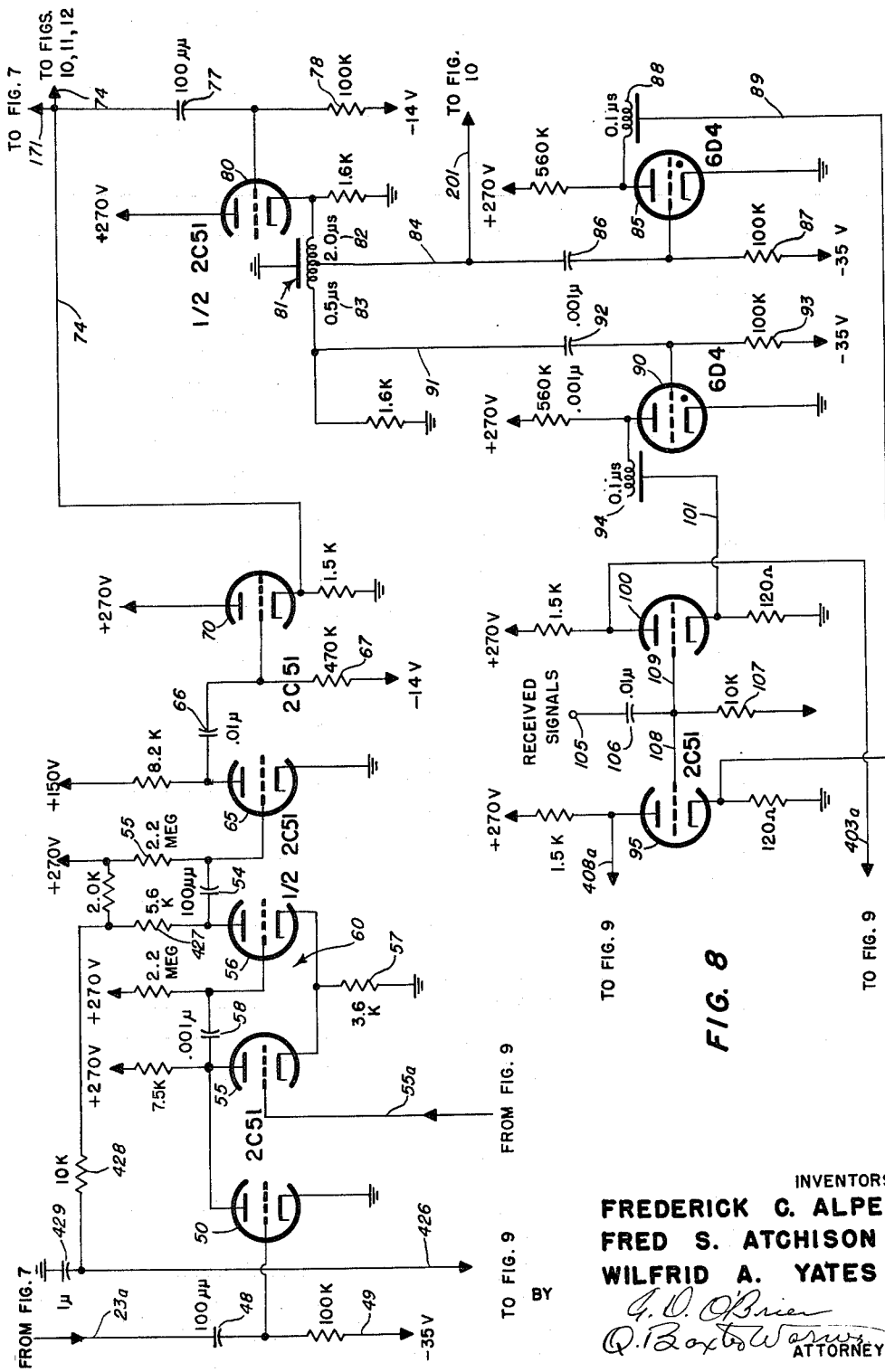

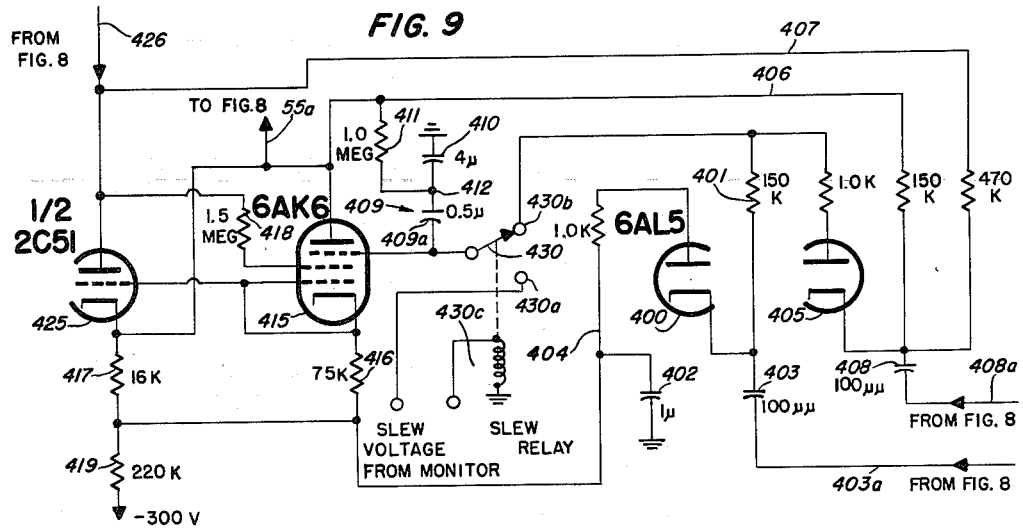
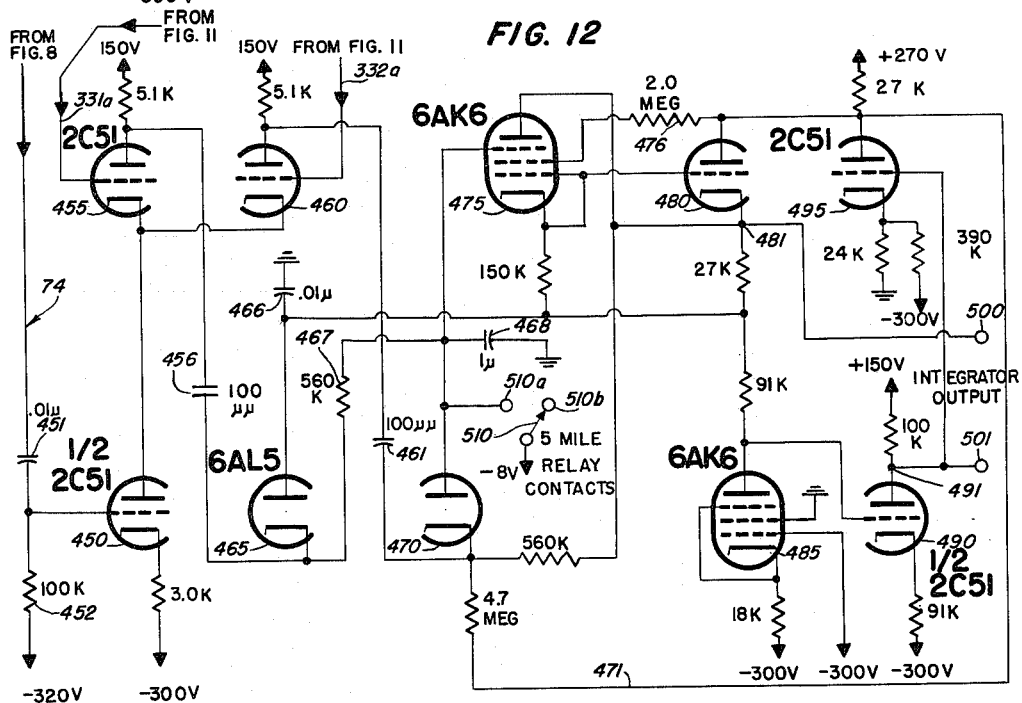

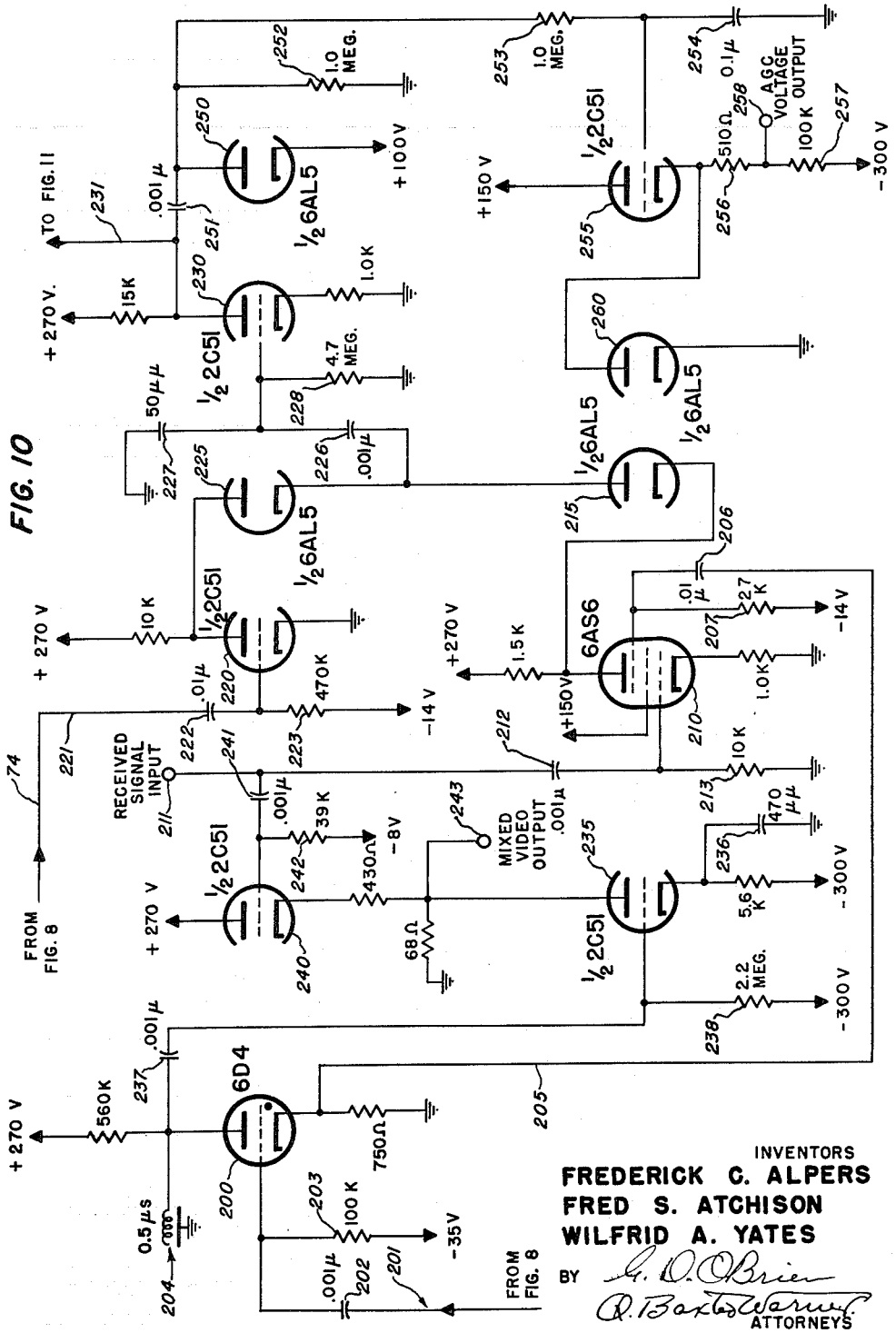

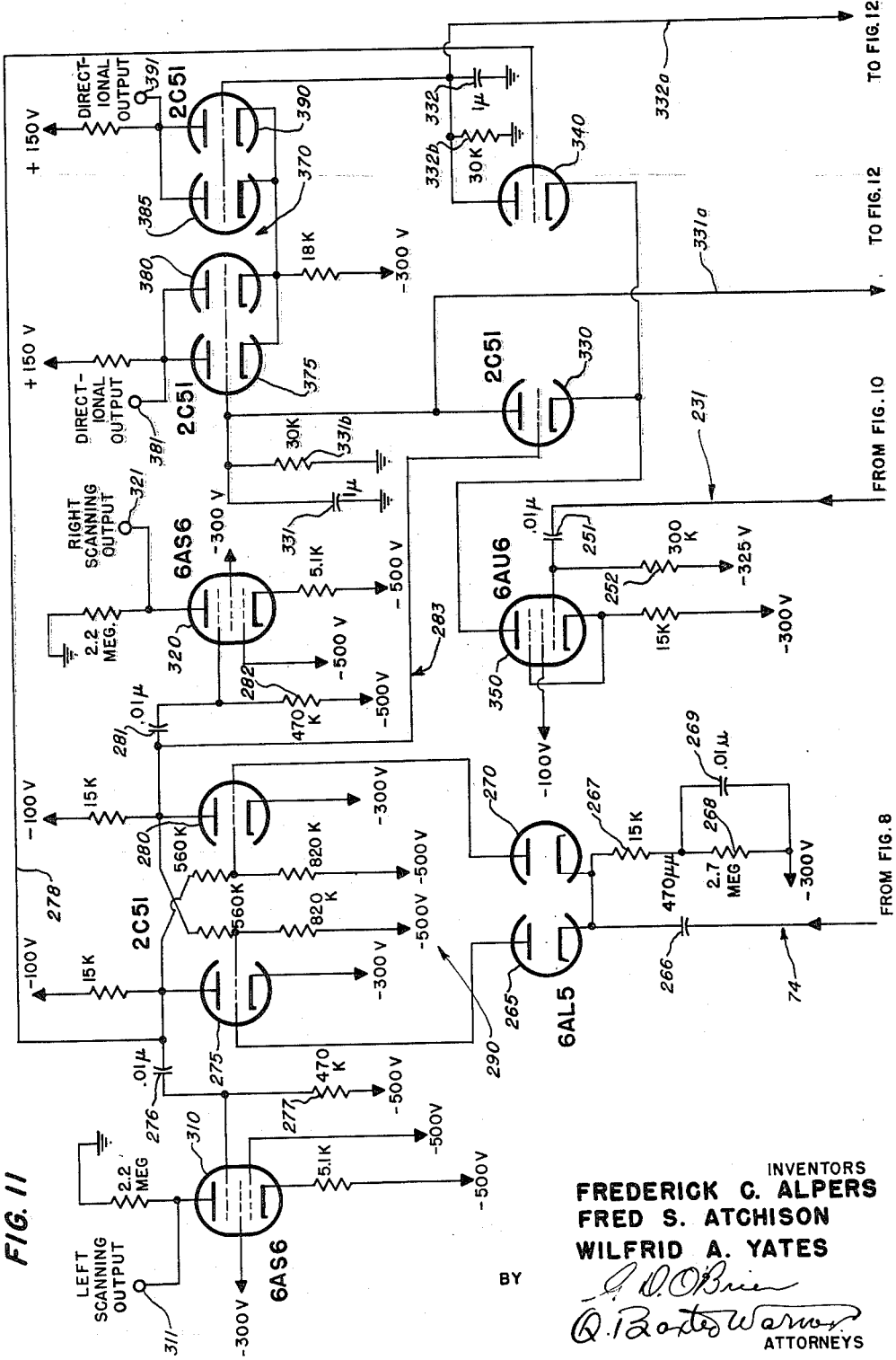

United States Patent Office 3,093,821
Patented June 11, 1963

3,093,821
CONTROL SYSTEM FOR HOMING GUIDED MISSILE
Frederick C. Alpers and Fred S. Atchison, Corona, Calif., and Wilfrid A. Yates, Silver Spring, Md., assignors to the United States of America as represented by the Secretary of the Navy
Filed July 1, 1952, Ser. No. 296,772
8 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

The present invention relates generally to guided missiles, and more specifically to a control system for a long range homing guiding missile, particularly of the air flight class. As used in the present specification and appended claims, the term "homing" denotes a target seeking missile having a guidance or intelligence system contained within the missile and itself operating to derive information appropriate to direct the missile to a target, without adjunctive intelligence being fed to or control being exerted upon the missile from sources external thereof once launched; as distinguished from command guidance systems, wherein commands are transmitted to the missile from a remote station for directing the missile course, as determined appropriate from information amassed at the remote station. The term "control system" as used herein denotes specifically that portion of the overall homing missile's intelligence system which functions as the missile's nerve center in determining the position of a target relative to the missile.

In general, the overall intelligence system of a homing guided missile frequently comprises three primary units: first, a sensing system or unit for observing the presence of a target; second, a control system or unit responsive to the sensing unit for interpreting the observations of the latter to determine the position of a target thus sensed relative to the missile; and third, an autopilot responsive to the control system for computing the appropriate corrections to be made in the missile's trajectory to effect a homing course on the sensed target, and for accordingly directing the proper positioning of the missile's course control devices, such as rudders, elevators, ailerons, or elevons.

Many different types of target sensing systems are known to and have been employed in the homing guided missile art, as for example, sensing systems relying on light reflection from the target to distinguish it from its background, heat radiation emanating from the target, and sound waves emanating from the target or being transmitted by the missile and reflected back to the missile from the target; but the most prevalent sensing system currently employed in the guided missile art, particularly in air flight guided missiles, utilizes radio frequency electromagnetic energy, this energy being initially transmitted, continuously or in pulses, from the guided missile or a remote transmitting station and the echoes thereof reflected from the target being received by the missile sensing system. This latter sensing method is commonly referred to in the art as radar, and the pulse radar technique is the one most commonly employed. The specific embodiment of the control system to be presented subsequently, as exemplary of the present invention, is therefore particularly designed to locate a target relative to the missile in response to a pulse radar sensing or observation of the target, although the invention is not limited thereto; and although specifically designed to cooperate with a missile carried radar transmitter, the specific embodiment may be readily modified to cooperate with an independent remote transmitter operating to irradiate the target.

In interpreting the observation had by the sensing system, the present control system accomplishes two important functions: one, it measures the sensed target's range from the missile; and two, it determines the sensed target's bearing relative to the missile. Since electromagnetic energy travels at a known and constant rate, this characteristic of the sensing energy is utilized by the control system in determining target range. This may be accomplished by making an accurate determination of the time interval required for a particular radar pulse to travel from the missile to the target and return to the missile, and comparing this time interval with accurate time standards generated by the control system which are accurately definitive of desired time intervals or ranges. The second function of the control system, determining target bearing relative to the missile, may be accomplished by effecting a desired directional radar scan in space in accordance with any of the several techniques known to the art, commutating the target echo pulses received from a plurality of directions within the scan into a plurality of channels, and comparing the energy contents of the received radar echo pulses obtained from these several directions with each other. The comparative energy contents provide an indication of target bearing relative to the missile, for the closer a particular direction in the radar scanning pattern is to the actual direction of target bearing, the stronger are the received target reflected echoes from that direction. For example, where it is desired to obtain information as to target bearing relative to the missile heading in only one plan of observation, as in azimuth, radar pulses may be transmitted and received, in two angularly displaced azimuth directions alternately, or what is the equivalent, transmitted in the two azimuth directions simultaneously but received from the two directions alternately and in sequence with the transmissions, and the relative power contents of the target echo pulses received from one of said azimuth directions as compared with those received from the other azimuth direction provide an indication of target bearing relative to missile heading.

In addition to the foregoing functions of the control system, there are numerous other functions correlative thereto that must be performed by the control system of a refined homing missile of the type with which the present application is concerned. For example, during the homing flight of the missile, the target might as a result of missile gyrations be lost momentarily to the sight of the missile's sensing system. Therefore, in order to enhance the effectiveness of the missile, it is highly desirable that the control system possess a memory of target observation in order that the combination of control and sensing intelligence be in condition to resume observation of the target when it is returned to the field of missile vision. Additionally, it is apparent that should the operation of the control system be limited to determining target bearing and range, the missile is obtaining information sufficient to determine only a pursuit course to the target. Since pursuit course attack paths are frequently ineffective, particularly when directed against high speed and highly maneuverable targets, it is desirable that the control system of a homing missile be able to compute a collision course or approximate collision course to the target when desired. This may be accomplished for example, by integrating the changes in missile heading required to maintain a pursuit course to the target over a period of time as the missile advances toward a moving target. This integrated information may be utilized to insert appropriate lead in missile navigation to divert the missile from a simple pursuit course to a collision course. Also, it is desirable for efficient operation of a homing guided missile that the control system be able to distinguish one target from all others that may be present within the sensing system's field of vision. To this end the control system may be adapted to be locked on to a particular selected target, so as to accept range and bearing information of the selected target only, to the exclusion of all others. This may be accomplished, for example, by incorporating in the control system an automatic range tracking circuit which continually tracks the selected target in range, thereby identifying it by range from all others. The present control system includes all of the foregoing features and other additional features, as will be most clearly comprehended from a consideration of the subsequent description of one detailed embodiment of a control system encompassed by the present invention.

Before considering a detailed embodiment of the present invention however, it is deemed desirable to facilitate an understanding thereof, that the relationship of the intelligence obtained by the combined efforts of the sensing and control systems to effecting missile navigation, be first explained. In a homing missile, the ultimate control of missile navigation is usually vested in an autopilot which frequently is constructed and designed basically in the form of an analogue computer, of one type or another depending upon the requirements imposed upon the guided missile. In an air flight homing guided missile, for example, the usual function of the autopilot is to correlate the intelligence obtainted from the combination of the sensing and control units, and mediately or immediately effect the proper actuation of the missile's aerodynamic control surfaces in response thereto so that the missile flies the course sought by the requirements of the missile. As is appropriate for the purposes of many guided missiles, the range of the target and the bearing thereof in both the azimuth and elevation planes are determined by the combined efforts of the sensing and control units. Information thus obtained is fed to the autopilot and there resolved to determine the changes that need be effected in the missile's flight path in accordance with the requirements demanded of the missile and incorporated in the autopilot design. But, in addition thereto, and most particularly in air flight guided missiles, the problem of missile stability against pitch, roll, and yaw must also be considered by the autopilot; and therefore, autopilots are usually designed to simultaneously consider apparent requirements for changes in the missile flight path together with missile gyrations resulting from instability or other causes, in determining the appropriate changes to be made in the missile's aerodynamic control surfaces. Thus, the function of the control system is to place the vision of the sensing system in a form intelligible to the autopilot, so that the autopilot may then determine what actions need be taken by the missile to meet the missile flight program requirements.

As is apparent, various control system embodiments may be designed for accomplishing the general functional scheme of a homing guided missile intelligence system to suit the particular needs and requirements of various specialized guided missile applications. The particular control system, which is subsequently described in detail as one exemplary embodiment of the present invention, is specifically designed for use primarily in an air flight homing guided missile, operating to deliver an underwater sonic homing torpedo or the like over a long range into the vicinity of and generally directed toward a surface or surfaced marine craft. Since a surface marine craft has at all times a fixed altitude, namely sea level, it is readily apparent that in this specific application of guided missiles the sensing and control systems need be concerned solely with azimuth bearing intelligence, and may completely ignore missile to target elevation bearings. For this purpose it is therefore contemplated that the missile's altitude program or trajectory be completely predetermined and incorporated in the design of the autopilot. For example, the missile may be programmed to seek a fixed altitude level at all times, and the autopilot may be readily designed to function in cooperation with an altimeter to continually direct the missile to and stabilize it about the chosen fixed altitude level; while azimuth bearing information is simultaneously fed to the autopilot as a result of the sensing system and control system obtained observation of the target. Further, in accordance with a specific flight program for which the present control system is particularly designed, it feeds bearing information to the autopilot in appropriate form for directing the missile on a pursuit course to the target over the contemplate major portion of its trajectory, and then at a predetermined missile to target range converts this target bearing information into a form appropriate for enabling the autopilot to direct the missile on a collision course to the target. In addition, this specific control system is designed to effect a release of the torpedo payload from the air flight guided missile at an appropriate predetermined missile to target range, whereupon the final maneuver of the attack is accomplished in the usual manner of a sonic homing torpedo.

In accomplishing the flight program hereinabove indicated, the instant control system is designed to be preset prior to release or launching, through the medium of adjunctive equipment referred to in the art as a monitor, to seek a preselected target. As previously indicated, the control system cooperates with the sensing system to measure target range, and its target lock-on characteristic is effected through this function. To this end, prior to release or launching of the missile, a range Tracking Unit is adjusted, through the monitor, to provide a range indication corresponding with the then existing range of a selected target. Thereupon, control of the range Tracking Unit is removed from the monitor, and with the reception of each radar pulse echo the Tracking Unit compares the existing range indication with that observed in the instant radar cycle, slight discrepancies between ranges indicated and those observed being corrected as necessary into equality in accordance with the observations. In this manner the selected target is continually identified by the control system, and this identification is utilized in the other sections of the control system to limit their functioning in response to the selected target only, ignoring all targets at other ranges that may be in the sensing system's field of vision. In order to make this range tracking and resultant target identification consistent and reliable in operation, the Tracking Unit is provided with a memory of the last observed target range and the rate at which that range has been changing, enabling the system to anticipate changes in target range, and should the target be momentarily lost to the intelligence system, enabling target range indications nevertheless to vary at the same rate and to continue to provide the correct target range; the control system thus remains locked onto the selected target at all times and in readiness to resume range tracking when the intelligence system regains observation of the target.

Since, in addition to target range tracking, the instant control system is intended to determine continually selected target bearing from the missile in azimuth, a Directional Unit is provided to commutate and compare the power contents of received selected target echo radar pulses obtained from two angularly displaced azimuth directions of preferential reception, the direction of greater echo pulse power content indicating the direction of alteration of missile heading required for an on target course. The target range indications obtained by the Tracking Unit are utilized by a Selector Unit for gating the acceptance of target echo pulses by the Directional Unit, to limit the latter's response to target echo pulses corresponding only to the then existing selected target range indication, i.e. limiting response to the echo pulses of the selected target only.

By a mere comparison of the target echo radar pulse contents obtained from the two azimuth directions of vision, it is apparent that information obtained thereby is suitable for directing the missile merely on a pursuit course. Since it is intended to direct the missile on a collision course to the target during the latter portion of its air flight trajectory, the instant control system is provided with an Integrating Unit for integrating the required missile heading changes as determined by the Directional Unit, for pursuit navigation, thereby providing information appropriate for enabling the autopilot to direct the missile on a collision course to the target.

The control system is further provided with a Range Switching Unit wherein, in the instant embodiment, two accurate time or range standards are generated with each radar pulse transmission, and these standards are continually compared with the target range indications established by the range Tracking Unit. When, as determined by the Range Switching Unit, actual target range becomes equal to the particular range standard generated by one section of the Switching Unit, the Integrator Unit is initiated to direct the missile onto a collision course to the target rather than a pursuit course; and when actual target range becomes equal to the range standard generated by the other section of the Range Switching Unit, the underwater torpedo payload of the missile is released from its air flight carrier, terminating the mission of the air flight guided missile and of the instant control system.

It is therefore one object of the present invention to provide a control system for a guided missile functioning to interpret information obtained by an appropriate sensing system, and delivering information so interpreted to an autopilot to enable the missile to home upon a target.

Another object of the present invention is to provide a control system for a guided missile for interpreting information obtained from an appropriate sensing system to determine missile to target range and bearing.

Another object of the present invention is to provide a control system for a guided missile which enables the missile to home upon a selected target by continually determining missile to target range and bearing from information obtained by a sensing system, to the exclusion of all other targets present within the field of vision of the sensing system.

Another object of the present invention is to provide a control system for a guided missile which enables the missile to home upon a target by continually determining missile to target range and bearing from information obtained by a sensing system, to deliver a payload into the vicinity of and directed generally toward the target.

Another object of the present invention is to provide a control system for a guided missile which enables the missile to home upon a target by continually determining missile to target range and bearing from information obtained by a sensing system, and which provides a memory of target range and rate of change of target range, to enable continual homing of the missile during a momentary loss of the target from the sensing system's field of vision.

Another object of the present invention is to provide a control system for a guided missile which enables the missile to home upon a target by continually determining missile to target range and bearing from information obtained by a sensing system, and which derives from changes in target bearing, information appropriate for determining substantially a collision course to the target.

Another object of the present invention is to provide a control system for a guided missile which enables the missile to home upon a target by continually determining missile to target range and bearing from information obtained by a sensing system, and which provides desired range standards for enabling the automatic accomplishment of desired missile functions at predetermined missile to target ranges.

A still further object of the present invention is to provide a control system for a guided missile: which enables the missile to home upon a selected target, to the exclusion of all other targets, by continually tracking the selected target in range from information obtained by a sensing system, identifying the selected target by the range information, and determining the bearing of the thus identified target from information obtained by the sensing system, to deliver a payload into the vicinity of and directed generally toward the target; which provides a memory of selected target range and rate of change of range to enable continual homing of the missile during a momentary loss of the target from the sensing system's field of vision; which derives from changes in target bearing, information appropriate for determining a collision course to the target; and which provides desired range standards for enabling the automatic accomplishment of desired missile functions at predetermined missile to target ranges.

Other objects and advantages of the present invention will become apparent to those skilled in the art from a consideration of the following general and detailed description of one embodiment of the present invention had in conjunction with the accompanying drawings, in which the same indicia refer to the same or corresponding parts or information and wherein:

FIG. 1 is a basic block diagram of the present control system illustrating the relationship of the several units;

FIG. 2 is a time chart illustrating the time sequence and relationship of the principal signals obtained in the operation of the present control system, for three cycles of operation;

FIG. 4 is a functional block diagram of the Selector Unit;

FIG. 5 is a functional block diagram of the Range Switching Unit;

FIG. 6 is a functional block diagram of the Directional and Integrator Units;

FIG. 7 is a detailed embodiment of the Trigger and Range Switching Units;

FIG. 8 is a detailed embodiment of a portion of the Tracking Unit;

FIG. 9 is a detailed embodiment of the remainder of the Tracking Unit;

FIG. 10 is a detailed embodiment of the Selector Unit;

FIG. 11 is a detailed embodiment of the Directional Unit; and

FIG. 12 is a detailed embodiment of the Integrator Unit.

*General System*

Figure 3:
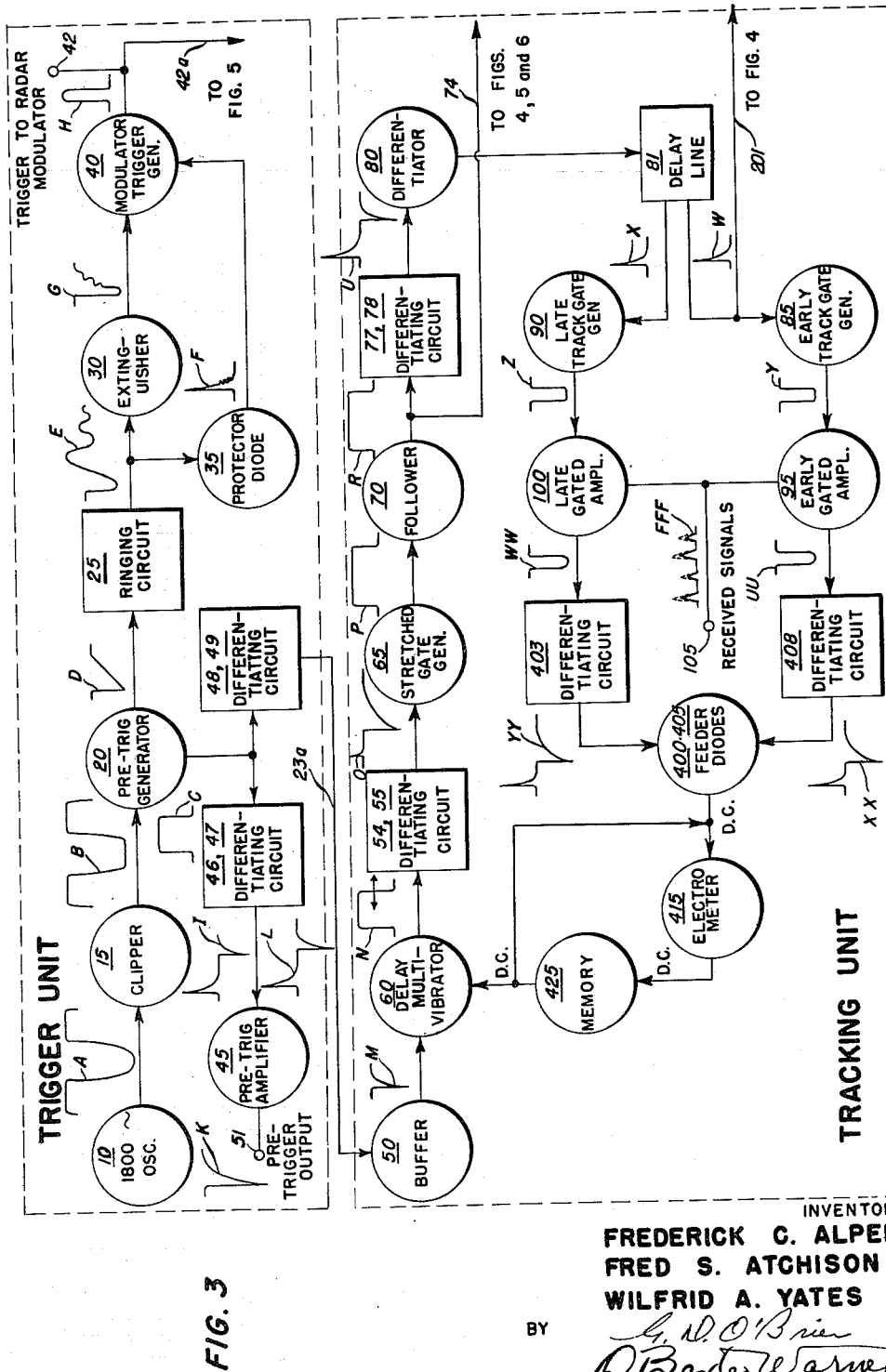
FIG. 3 is a functional block diagram of the Trigger and Tracking Units.

Having mentioned above the purposes and functions of a control system for a homing guided missile, reference is made to the block diagram FIG. 1 which illustrates the functional relationship of the several major components or units of a control system for accomplishing the desired results. The timing key for each repetition cycle of the pulse radar sensing and the control systems originates from an oscillator or the like in the Trigger Unit, initiating with each oscillation cycle a system repetition cycle by providing a dual Trigger Unit output, L and H. Pulses L are termed pretriggers, and pulses H, modulator triggers.

Modulator triggers H are utilized in part to trigger a radar transmitter modulator line and thus initiate the radar cycles, while substantially simultaneously therewith the pretriggers L are utilized to trigger or provide time bases referenced to radar pulse transmissions for the Tracking Unit. Upon the return of echo pulses of each transmitted radar pulse initiated by modulator triggers H, a series of time spaced signals similar to the pattern FFF may be obtained as the video output of a radar receiver, indicating by the several time displaced pips the presence of several targets at different ranges. Two patterns FFF are indicated in the drawings, one by a solid line and the other by a superimposed dotted line. As previously mentioned, the specific control system embodiment to be here described is designed to cooperate with a radar system having two directions of preferred echo reception, reception from the two directions being had in sequence. When any target in the radar field of vision is not angularly centered between these two directions of reception, an off-target antenna heading is indicated by a difference in target echo signal power between receptions from these directions. The dotted line pattern FFF represents received signal power from one direction of reception, while the solid line pattern FFF represents received signal power from the other direction. For simplification, in the illustration the amplitudes of all dotted line pips of FFF are greater than those of corresponding solid line pips, thereby indicating that the antenna heading is accordingly displaced from an on-target position for all targets within its field of vision. Each of the target echo pips composing receiver output FFF for each repetition cycle is coupled into the Tracking Unit. To range track a selected target as the missile closes in on it, the time phase of a tracking gate (not indicated in FIG. 1) generated by the Tracking Unit is there compared during each cycle with that of the selected target echo pip and automatically adjusted into a desired time phase relationship therewith, the selection of a particular target to be tracked being accomplished by initially adjusting the time phase of the tracking gate into the desired relationship with the chosen target echo pulse. The leading edges of a Tracking Unit range pulse R and of an early tracking gate trigger W for each cycle are keyed to a desired fixed time relationship with said tracking gate, and hence both represent by their instantaneous time phases with relation to corresponding pulses H and L an instantaneous measure of selected target range, and are thus maintained substantially in a desired time relationship to the reception of the selected target echo signal as obtained in each radar repetition cycle.

Tracking gate triggers W are applied to the Selector Unit along with each cycle's video signals FFF from the radar receiver. With the time phases of pulses W continually adjusted by the Tracking Unit to be in substantial coincidence with reception of each cycle's selected target echo signal, they are utilized to gate the input FFF to the Selector Unit and pass only that echo pip of each cycle which is being range tracked by the Tracking Unit. The selected target echo signals thus passed are power amplified with the aid of pulses R and then coupled as output pulses II to the Directional Unit. The pulses II are indicated in the drawings as possessing two amplitudes, the dotted line amplitude being obtained from the dotted line Selector Unit input of FFF, and the solid line amplitude from the solid line input of FFF.

The pulses II obtained from the Selector Unit are fed to the Directional Unit where they are commutated with the aid of pulses R in accordance with the direction of preferential reception had in the particular cycle, and the relative powers of the thus commutated pulses are continually compared to provide a differential D.C. output from this Unit whose magnitude and direction is a measure of target bearing. This output may then be utilized to direct the missile on a pursuit homing course.

When desired, the requirements for changes in missile heading obtained as the output of the Directional Unit may be integrated in the Integrating Unit with the aid of pulses R, whose D.C. output may then be utilized to insert a target lead function into missile navigation, and hence enable guidance of the missile on a collision or substantially a collision course.

Additionally, it will be noted that the modulator triggers H and the range pulses R are applied to the Range Switching Unit. It will be recalled that the time phase difference between each trigger H and the leading edge of each pulse R for any repetition cycle is a measure of selected target range. Where it is desired that certain functions be performed in or by the missile at a predetermined target range or ranges, the pulses H are utilized to trigger appropriate predetermined time delay circuits in the Range Switching Unit to provide pulses whose trailing edges are time delayed from respective triggers H by an amount corresponding to the desired target range. The time phases of the leading edges of range pulses R and of the above-mentioned trailing edges are compared in the Range Switching Unit for each cycle. Time coincidence between the leading edge of a range pulse R and the trailing edge of a corresponding time delayed pulse then indicates that the missile is at the desired range, and the coincidence of the pulses is utilized to provide an output for energizing a relay or the like and accomplishing the predetermined function in or by the missile.

The control system thus functions to trigger the radar pulse transmitter, to track a selected target in range, to provide a continual indication of selected target range from the missile, to initiate desired functions in or by the missile at predetermined selected target ranges, to provide selected target bearing information, and when desired to provide a measure of appropriate lead angle for directing the missile on substantially a collision course with the selected target.

To facilitate a more ready understanding of the following detailed embodiment of the present invention, the time chart FIG. 2 is presented, indicating qualitatively the time relationships of the several pulses hereinabove discussed, for three repetition cycles of the system. It will be noted that the first occurrence in time for each cycle is the pretrigger L followed very shortly by the radar modulator trigger H, representing the two outputs from the Trigger Unit. As a result of trigger H, a radar pulse is transmitted from the radar antenna, and sometime thereafter, depending upon the range of targets within the missile radar's field of vision, a pattern of pips FFF is obtained as the video output of the radar receiver. Assuming the Tracking Unit is tracking the last pip of pattern FFF, the early tracking gate trigger W is generated by the Tracking Unit in response to pretrigger L and in time delayed relationship thereto so as to be substantially in time coincidence with the leading edge of said last pip of FFF. The Tracking Unit additionally provides the range pulse R in response to pretrigger L, having a leading edge in fixed time relationship to, slightly preceeding, early tracking gate trigger W, and having a fixed time duration. Early tracking gate trigger W is used in the Selector Unit to gate the pattern FFF, passing only the selected target pip, the last one as here shown. This selected pip is then time amplified by the range pulse R to the duration of the latter's existence and passed on to the Directional Unit as pulse II for utilization in determining selected target bearing.

With the sequential two directional radar scan previously indicated as to be employed with the specific control system embodiment to be described, when the antenna heading is not on target, the amplitude of pattern FFF varies between alternate sets of cycles as indicated by the amplitude difference between pattern FFF of cycle two and those of cycles one and three. Consequently, the amplified selected target signals II, although all of equal time duration, vary accordingly in amplitude. Also it will be noted that in progressing from cycle one to cycle three the patterns FFF and resultant selected target signals II move in closer in time to pretriggers L and radar modulator triggers H, indicating that the missile is closing in on the target. Because of the automatic range tracking feature of the present control system, the range pulses R and early tracking gate triggers W likewise move in therewith and maintain substantially the same time relationship to the selected pip of patterns FFF. It is therefore readily apparent that the time intervals between either pretriggers L or modulator triggers H and either range pulses R or early tracking gate triggers W provide continual measures of selected target ranges, while the difference in power between selected target signals II obtained in alternate cycles may be utilized to derive the target bearing from the missile.

Having thus indicated the general relationship of the several major components going to make up the present control system and the time relationships and general functions of the major outputs derived therefrom, the following discussion relates primarily to a more detailed consideration of each of those components and how the outputs therefrom are obtained.

Trigger Unit and Tracking Unit

FIG. 3 provides a schematic and functional representation of the components of the Trigger and Tracking Units. The Trigger Unit provides the primary operational cycle timing reference for and synchronization between the control and sensing systems. To accomplish these functions, the Trigger Unit produces two sets of pulses, the pretriggers L (of which only the leading portion is significant to the operation of the system) for actuating the Tracking Unit, and the modulator triggers H for initiating the radar or other energy pulse transmissions of the sensing system and triggering the time delay circuits of the Range Switching Unit. To produce these two outputs, the Trigger Unit is provided with an oscillator 10 for generating a sinusoidal output of any appropriate and desired frequency, which because of the clipper 15 is shown as partially clipped wave form A. The frequency chosen, as will become apparent, determines the repetition rate of the sensing system's radar cycle and control system's operational cycle. The output A of oscillator 10 is then completely clipped by the clipper 15 into substantially square wave forms B, and the resultant pulses thereof are applied as a series of triggers to the pretrigger generator 20. This generator provides square wave output C and sawtooth wave output D in time phase: square wave pulses C are converted on one hand to wave forms I by differentiating circuit 46, 47, amplified and rectified by pretrigger amplifier 45 to provide pulses K at pretrigger output 51, utilized by a monitor associated with the present system and whose function is subsequently described, and on the other hand are differentiated into wave forms L by differentiating circuit 48, 49 and applied to the Tracking Unit; while sawtooth wave pulses D are converted into wave forms E by ringing circuit 25 and applied in parallel to protector diode 35 and extinguisher 30. The outputs F of diode 35 and outputs G of extinguisher 30 have their leading edges in time phase and result from the first positive going portion of wave forms E; hence, they are time delayed with respect to the leading edges of corresponding sawtooth waves C and D, and the pretrigger pulses resulting from C. Each of the series of two pulses F and G act in combination upon the modulator trigger generator 40 to produce a series of short time duration pulses H, modulator triggers, for firing the modulator line of the sensing system's radar transmitter through output 42, thus initiating the transmission of sensing radar pulses. In parallel therewith, the modulator pulses H trigger the Range Switching Unit through channel 42a to provide the proper time references for the timing or range measuring circuits contained therein and to be subsequently discussed.

The basic purpose of the Tracking Unit is to provide a continual measure in terms of time of a selected target's range, and does so, in essence, by continually indicating the time interval between each radar pulse transmission and the reception of the selected target's echo thereof. The differentiated form L of pretrigger pulses C are fed to the Tracking Unit through an isolating buffer 50, which passes only the leading portion of wave forms L as pulses M to trigger a monostable delay multivibrator 60. The width of delay multivibrator output pulses N is variable and controlled by the output voltage of an electrometer and memory circuit 415, 425, as will be subsequently explained. As will become apparent after a consideration of the entire Tracking Unit loop, the time phase of the trailing edge of each multivibrator square wave output N with relation to the leading edge of the corresponding pretrigger pulse C, as established by the electrometer and memory circuit output, is, when properly interpreted, a measure of and controlled by selected target range. The pulses N are differentiated into wave forms O at 54, 55 and applied to stretched gate generator 65 to produce long duration square wave pulses P, whose leading edges are in time coincidence with the trailing edges of the corresponding multivibrator output pulses N, thus placing each leading edge thereof in the same time phase with relation to each pretrigger pulse C as was the trailing edge of the corresponding multivibrator output. Stretched gates P are then coupled through cathode follower 70 as range pulses R to the remainder of the Tracking Unit and to other portions of the control system, as will be subsequently described. Each pulse R in being applied to the remainder of the Tracking Unit is also differentiated at 77, 78 into wave form U, the leading or positive portion thereof being applied through differentiator 80 to delay line 81. The output of differentiator 80 is tapped off from delay line 81 at two points establishing a fixed time interval between early tracking gate trigger pulses W and corresponding late tracking gate trigger pulses X. These triggers are applied respectively to the early tracking gate generator 85 for producing early tracking gates Y, and to the late tracking gate generator 90 to produce the late tracking gates Z.

The time relation of each set of gates Y and Z to reception of the corresponding desired echo pulse from pattern FFF, obtained from the radar receiver at input 105, is obtained by the early gated amplifier 95 and late gated amplifier 100. The powers of pulses UU issuing from amplifier 95 are determined by the degree of time coincidence or overlap between the selected target echo signals and the corresponding early tracking gates Y; and the powers of pulses WW issuing from amplifier 100 are likewise determined by the degree of time coincidence or overlap between the selected target echo signals and the corresponding late tracking gates Z. The powers of pulses UU and pulses WW are compared in the memory and electrometer circuit 425 and 415, being fed thereto as a differential output of the feeder diodes 400, 405. However, to effect this power comparison, for reasons that will subsequently become apparent, the pulses WW are differentiated at 403 into wave forms YY, and the pulses UU are differentiated at 408 into wave forms XX, prior to their application to the feeder diodes. The D.C. output from the combined efforts of the feeder diodes and electrometer and memory circuit is used to control the time constant or output pulse width of the multivibrator 60. The time phase of the trailing edges of pulses N is thereby adjusted during each repetition cycle as required by the electronic comparison of the early and late tracking gate time phases with that of the selected target echo reception, to keep the two gates Y and Z locked on the target echo, hence providing a measure in time of target range.

In explanation of the foregoing, with a condition established that the selected target received signals are sandwiched in time between the corresponding pairs of early and late tracking gates Y and Z, the time phase of the trailing edges of pulses N relative to that of the pretriggers, or the pulse widths of N, are considered to represent a measure of selected target range. The powers of pulses WW and UU being equal under this condition, there is no alteration of the memory circuit output and the width of pulses N is held constant. But should the time phase of a selected target echo pip vary relative to that of a corresponding pair of early and late tracking gates, as results from a change in target range, the power contents of the resultant pulses UU and WW are unbalanced in accordance with the direction and amount of variation, to correspondingly alter the electrometer and memory output and hence the time duration of subsequent pulses N, until the phase of the tracking gates controlled by the trailing edges of pulses N is changed to re-establish the power balance between pulses UU and WW. The output of the electrometer and memory circuit is thereby stabilized at this new value, and the new width of pulses N represents the new target range. The basic object of the Tracking Unit is thus to adjust the time phase of the trailing edge of the delay multivibrator square wave output continually, so as to sandwich the reception time phase of each selected target echo signal between the corresponding early and late tracking gates. When this condition prevails, the time phase of the trailing edge of the delay multivibrator outputs N (or what is the same, of the leading edge of the resultant pulses R) relative to the corresponding pretrigger pulses is a correct indication of selected target range.

Additionally, the feedback loop from the memory output to the electrometer input effects a continuous and automatic change in the electrometer and memory circuit output in accordance with the preestablished rate of change thereof resulting from the feeder diode input, hence enabling the tracking circuit to anticipate changes in target range and to continue tracking during a momentary loss of sight of the target.

Since the Tracking Unit thus continually and automatically adjusts itself to track that echo signal initially sandwiched between the two tracking gates, there is here provided a system for identifying the selected target and following it in range to the exclusion of all others. These lock-on and range measuring features of the instant Unit are utilized in the operation of other portions of the present control system. The means for and manner of initially selecting a desired target, by sandwiching its echo signal between the early and late tracking gates prior to launching of a missile containing the present control system, will be considered in the subsequent detailed description of the circuitry.

Turning at this point from the schematic approach of FIG. 3 and analyzing a specific circuit embodiment of these Units in detail, the master oscillator generally indicated by the numeral 10 in the Trigger Unit (FIG. 7) is designed in the instant embodiment to provide at the cathode of triode 12 an 1800 cycles per second output of the wave form A, which is substantially sinusoidal except for the flattened peaks of its positive pulses. The output of oscillator 10 is coupled to the grid of clipper triode 15 through resistor 11 to provide an output at the plate of triode 15 substantially of the wave form B. The flattened positive peaks of wave forms A are obtained by the flow of grid current through triode 15 and coupling resistor 11 when the grid potential of triode 15 reaches a limiting value as established by the design of the circuit, while the negative pulses of wave forms A are clipped by triode 15, as indicated by the positive pulses of wave forms B, by the passing of the grid potential of triode 15 below that tube's cutoff point. The approximate square wave plate output of clipper 15 is coupled to the grid of the gas triode 20 through the capacitor 16 and across the resistor 17. The fixed bias on gas triode 20 is established to place this tube normally below its firing potential, but upon the application of the cyclically recurring positive pulses of wave form B to the grid of this gas triode, it is fired. The fixed cathode to plate potential established for this gas tube is not sufficient to maintain conduction therethrough in the absence of said positive pulse upon the grid thereof; therefore, gas triode 20 produces cyclically recurring negative going sawtooth wave pulses D at its plate, and in time phase therewith positive going square wave pulses C at its cathode, with the application of the positive portions of wave form B thereto.

The negative going pulses D are applied to channel 22 and coupled through capacitor 21 to the ringing circuit generally indicated by the numeral 25, which includes capacitor 26 and inductance 27. The ringing circuit 25 converts each sawtooth wave pulse D into a decaying oscillation pattern generally indicated by the wave form E, the leading edge of which is in time phase with the leading edge of the corresponding pulse D. The leading edge of the first positive going pulse of the wave form E is consequently timed delayed from the leading edge of said pulse D by an amount established by the overall capacitance and inductance of channel 22, providing in the instant embodiment a four microsecond delay. Each wave form E is applied simultaneously to the grid of extinguisher triode 30 and to the plate of protector diode 35. The fixed bias on diode 35 is so chosen as to pass to its cathode circuit only the positive portions of each oscillating wave form E, as indicated by the wave form F, which is applied to the grid of modulator trigger generator gas triode 40 and is of sufficient magnitude to fire the gas tube 40. Returning to the plate output of the gas tube 20 as modified by the ringing circuit 25, each wave form E as previously mentioned is applied also to the grid of the extinguisher triode 30 simultaneously with its application to the plate of the protector diode 35. As a result of the application of the first positive going pulse of wave form E to the grid of triode 30, there is provided at its plate a pulse substantially of wave form G. A 2.7 microsecond inductance-capacitance delay line 31 is connected to the plate of gas triode 40 and through resistor 32 to the plate of the extinguisher triode 30. Prior to each firing of the gas tube 40, during interpulse time intervals obtained in the plate output of triode 20, the delay line 31 is charged to a value of substantially 270 volts, the plate supply voltage of tubes 30 and 40. In view of the time coincidence of the appearance of each pulse G on the plate of extinguisher triode 30 with each firing of gas tube 40 through the application of pulses F to the grid thereof, the plate potential of gas tube 40 is reduced to a value which cannot sustain conduction therethrough even when triggered except during the discharging of the capacitance of delay line 31. In this manner, therefore, the gas triode 40 is periodically fired and conduction therethrough is sustained approximately 2.7 microseconds before the tube is extinguished, providing cathode output pulses substantially of the wave form H of approximately the mentioned time duration. Pulses H are applied to output 42 as modulator trigger pulses for firing the radar transmitter modulator line, and are simultaneously applied as the time reference for the time delay circuits of the Range Switching Unit to be subsequently described.

Considering next the square wave pretrigger pulses C obtained at the cathode of the gas triode 20, they are applied along channel 23 to pretrigger amplifier 45 through the R-C differentiating circuit comprising capacitor 46 and resistor 47. The pulses C are thus differentiated into a wave form indicated by I before being applied to the grid of amplifier triode 45. Since triode 45 is normally biased at or below cutoff, the negative pulse of each wave form I has no effect upon the plate output of this tube, but the positive pulses of said wave forms are amplified and inverted to provide pulses K at the pretrigger output 51, each in time phase with the leading edge of its corresponding pulse C. Simultaneously with the application of pulses C to the pretrigger amplifier, they are applied to the Tracking Unit (FIG. 8) through channel 23a, where they are differentiated by the capacitor 48 and resistor 49 into wave forms L.

Each wave form L is applied to the grid of the buffer triode 50, which is normally biased at or below cutoff potential, to provide a plate output of negative pulses M in time phase with the positive pulse of each corresponding wave form L. The plate of triode 50 is coupled through capacitor 58 to a delay multivibrator 60, which has thus been isolated by the buffer from the supply voltages present at the Tracking Unit input. The delay multivibrator 60 is a conventional circuit comprising the two triodes 55 and 56 whose cathodes are coupled through a common resistor 57 to ground. Being a monostable type, the delay multivibrator produces a square wave pulse output of wave form N at the plate of triode 56 for each negative trigger pulse M, and the trailing edges of pulses N are time phasable with respect to the leading edges of said pulses in accordance with the grid bias established on triode 55. The value of this bias is established by the Tracking Unit's electrometer and memory circuit (FIG. 9) described hereinbelow. The square wave pulses N are coupled to the grid of stretched gate generator triode 65 through an R-C circuit having a very short time constant for the positive going edges of pulses N as a result of grid conduction in tube 65, while on the negative going edges thereof capacitor 54 must discharge through the relatively large resistor 55, providing an R-C circuit of a very long time constant. As a result of this circuit arrangement, the differentiation of each square wave pulse N results in a wave form substantially as indicated at O. Triode 65 is established to be normally conducting, but the magnitude of the negative going pulse of each wave form O is sufficient to lower the grid potential of said triode below its cutoff point for the duration of the major portion of this pulse, thereby producing square wave pulses P at the plate of this triode having a fixed time duration, in the instant embodiment of approximately 60 microseconds. Since the leading edge of the negative going pulse of each wave form O is established by and is in time coincidence with the trailing edge of the corresponding wave form N, the same is true of the leading edge of each stretched gate pulse P, and consequently the time relationship thereof to the corresponding trigger M is thus established by the delay multivibrator and controlled by the grid bias on triode 55 thereof. The stretched gate pulses P are coupled through the capacitor 66 and across the resistor 67 to the grid of cathode follower triode 70 to provide a low impedance output represented by range pulses R at the cathode thereof, substantially equal to and in time coincidence with corresponding pulses P. The output pulses R of the cathode follower 70 are applied to channel 74.

Pulses R, as will be described, are applied to the remaining portion of the Tracking Unit, to the Range Switching Unit, to the Selector Unit, to the Directional Unit, and to the Integrator Unit. In the application of pulses R to the remainder of the Tracking Unit, they are first differentiated through the R-C differentiating circuit comprising capacitor 77 and resistor 78 to provide wave forms at the grid of differentiator triode 80 indicated by U. Since triode 80 is normally biased at or below cutoff potential, only the positive going pulse of each wave form U has an effect on the conduction therethrough, and provides a corresponding pulse on the cathode of said triode. The cathode output of this triode is applied to a delay line generally indicated by numeral 81 comprising two parts; in the instant embodiment one part 82 provides a 2.0 microsecond time delay, and the other part 83 provides an additional 0.5 microsecond time delay for the output pulses of triode 80. The output of triode 80 when delayed 2.0 microseconds is transmitted along channel 84, as indicated by triggers W, and coupled to the grid of the gas triode early tracking gate generator 85 through capacitor 86 and across the resistor 87; the output of triode 80 when delayed 2.5 microseconds is transmitted along channel 91, as indicated by triggers X, and coupled to the grid of the late tracking gate generator gas triode 90 through the capacitor 92 and across the resistor 93. Each trigger W applied to the gas triode 85 triggers the same into conduction for approximately 0.1 microsecond as established by the 0.1 microsecond pulse forming line 88 in the plate circuit of said triode, whereupon the triode is extinguished by the inability of the supply voltage thereacross to support continued conduction therethrough, thereby producing negative going square wave pulses Y along channel 89. Similarly, each pulse X applied to the grid of the gas triode 90 triggers this triode to conduction, and it conducts for 0.1 microsecond as established by the 0.1 microsecond pulse forming line 94 in the plate circuit thereof, whereupon this triode is also extinguished by the inability of the supply voltage thereacross to support continued conduction therethrough, thereby providing the negative going square wave pulses Z along channel 101. Since triggers W in channel 84 lead the corresponding triggers X in channel 91 by 0.5 microsecond and the same time relationship exists between corresponding pairs of square wave pulses Y and Z in channels 89 and 101, respectively, pulses Y are termed the early tracking gates while pulses Z, the late tracking gates, and triggers W and X are termed the early and late tracking gate triggers, respectively.

Pulses Y, the early tracking gates, are transmitted along channel 89 to the cathode of the early gated amplifier triode 95; while pulses Z, the late tracking gates, are transmitted along channel 101 to the cathode of the late gated amplifier triode 100. Also, any and all signals received by the radar receiver are applied in video form as represented by FFF to the received signal input 105 and coupled through the capacitor 106 and across the resistor 107 to the grid of early gated amplifier triode 95 along channel 108 and the grid of late gated amplifier triode 100 along channel 109. The bias on these tubes is so adjusted that neither one can conduct except upon simultaneous application of a tracking gate to the cathode thereof and a received signal pulse to the grid thereof. Therefore, whenever a received signal pulse is sandwiched in time equally between the corresponding early and late tracking gates, which is the accurate tracking situation, the outputs of the two gated amplifiers 95 and 100 are equal; whereas, should a received signal pulse be in time coincidence with a greater portion of either the corresponding early or late tracking gate than the other, that gated amplifier affords more conduction therethrough and hence greater power in its output than does the other, providing a measure of and indicating the direction of range tracking error. Output differences from these two amplifiers are applied to the electrometer and memory circuit, generally indicated by numerals 415 and 425 (FIG. 9) through the feeder diodes 400, 405, to alter the bias on the grid of triode 55 of the delay multivibrator 60 and correct the trailing edge time phase of subsequent pulses N to a more accurate measure of selected target range, until proper balance is obtained between outputs UU and WW of the gated amplifiers.

Considering the electrometer and memory circuit of this Range Tracking Unit in detail (FIG. 9), reference is first had to the input therefor as embodied in the two feeder diodes 400 and 405. As above described, time coincidence of a received radar echo signal pulse obtained through input 105 with a portion of either the early tracking gate or the late tracking gate of a particular system cycle, provides an output pulse UU in the plate circuit of the early gated amplifier if coincidence of the received signal is had with the early gate, and an output pulse WW in the plate circuit of late gated amplifier if coincidence of the received signal is had with the late gate pulse Z. In the case of early gate coincidence, the pulse UU is coupled to the cathode of the early gate feeder diode 405 through the capacitor 408 by channel 408a; while in the case of a late gate coincidence, pulse WW is coupled through capacitor 403 by channel 403a to the cathode of the late gate feeder diode 400. Both of these feeder diodes are back biased in equal amounts against conduction therethrough, and this back bias is bootstrapped to the electrometer and memory circuit output, in the case of diode 405 through channels 406 and 407, and in the case of diode 400 through channel 404. In the instance of an output pulse UU from the early gated amplifier 95, it is differentiated into the wave form XX, the negative going portion thereof having a relatively short time constant as it overcomes the back bias of the feeder diode 405 to provide conduction therethrough and through the low resistance plate circuit thereof, the positive going portion thereof having a relatively long time constant as it is applied to the high resistance of channels 406 and 407. In the instance of an output pulse WW from the late gated amplifier 100, it is similarly differentiated into the waveform YY, the negative going portion thereof having a relatively short time constant as it overcomes the back bias of feeder diode 400 to provide conduction therethrough and in the low resistance plate circuit thereof, the positive going portion thereof having a relatively long time constant as it is applied through the relatively high resistance 401 into the plate circuit of the feeder diode 405. It can thus be seen that the occurrence of an early gated amplifier output UU drives the side 409a of capacitor 409 in a negative direction, as results from the negative going portion of the wave form XX, while the occurrence of a late gated amplifier output WW drives the side 409a of capacitor 409 in a positive direction, as results from the positive going portion of wave form YY, the positive going portion of early tracking gate signal XX being absorbed along channels 406 and 407 and the negative going portion of late tracking gate signal YY passing through the feeder diode 400 and being absorbed on the large capacitor 402. Thus, the two gated amplifier outputs UU and WW function in opposition to each other in their effect upon the side 409a of capacitor 409, driving its potential in a negative direction when early tracking gate signals UU predominate, to indicate that the Tracking Unit range measurement is in excess of the actual selected target range, while predominance of late tracking gate signals WW results in driving side 409a of capacitor 409 in a positive direction, indicating that the Tracking Unit range measurement is short of actual selected target range. If the received signal pulse is properly centered or sandwiched in time between the early and late tracking gates, there is either no signal output from gated amplifiers 95 and 100, or signal outputs obtained therefrom are equal, so that the potential level of side 409a of capacitor 409 is held constant in so far as feeder diode inputs thereto are concerned. The potential level of side 409a of capacitor 409, as established by the differential input thereto through the feeder diodes, provides a D.C. input for the electrometer tube 415.

The electrometer and memory circuit per se comprises in part the electrometer pentode 415 and a cathode follower memory triode 425. Before considering the operation of this circuit, it should be noted that the cathode of follower 425 is directly coupled to the plate of the electrometer 415, while the cathode of electrometer 415 is directly coupled to the grid of follower 425. Since the grid potential of cathode follower 425 is substantially fixed as a result of the follower action, the cathode to plate potential of the electrometer is similarly fixed and equal thereto. Since resistor 417 in the cathode circuit of follower 425 is chosen to be of a much lesser value than resistor 419, the voltage drop thereacross is substantially fixed and the level thereof follows the action of follower 425. Since electrometer 415 and its cathode resistor 416 are connected across resistor 417, the voltage drop thereacross is likewise substantially fixed, and therefore the cathode current of electrometer 415 may be substantially fixed at a desired value by choosing the proper value of resistor 416. It is to be further noted that the control grid of electrometer 415 is effectively removed therefrom by being tied directly to its cathode. Also, it is to be noted that if the plate to grid potential of follower 425 is maintained substantially constant, the same will be true of the cathode to screen grid potential of electrometer 415, since the cathode of this tube is coupled directly to the grid of follower 425 while the screen grid of the electrometer is coupled to the plate of the follower 425 through the resistor 418. In this manner the screen current of electrometer 415 is fixed at a desired value by choosing the proper value for resistor 418. For this purpose it has been assumed that the plate to grid potential of follower 425 is substantially constant, and the truth of this statement will be shown subsequently in a later portion of the discussion of this electrometer and memory circuit.

The normal operation of a suppressor grid in a pentode as electrometer 415 is to divide the cathode current between the plate and screen grid circuits thereof, but since as previously pointed out the cathode current is fixed, since the cathode to plate potential difference of electrometer 415 is likewise fixed, and since the screen grid current is also fixed, variations in suppressor grid potential operate to accordingly vary the cathode potential level of electrometer 415 in accordance therewith. Also, since the cathode of this electrometer is directly coupled to the grid of follower 425 and since the cathode of follower 425 is directly coupled to the plate of electrometer 415, the plate potential level of the electrometer is correspondingly altered in substantially the exact amount as is accomplished on the cathode, so that although the potential levels of the electrometer plate and cathode are altered, the potential drop therebetween is held substantially constant.

Having thus established the conditions under which the electrometer and memory circuit operates, the following discussion relates to its operation in response to signals obtained through the feeder diode circuitry. If for example, at any time during the operation of the instant tracking unit a pulse UU is obtained of greater power than the corresponding pulse WW, in accordance with the previous description of the Tracking Unit this condition signifies that the time phase of the trailing edge of output pulse N of delay multivibrator 60 must be brought in closer to its leading edge to provide an accurate measure of actual target range. With this condition obtaining, the feeder diode and gated amplifier circuitry shifts the charge on side 409a of capacitor 409 in a negative direction, and hence the suppressor grid of electrometer 415 tied thereto is similarly shifted providing an extremely high input impedance for the electrometer and memory circuit. In view of the previous discussion, this shift in suppressor grid potential correspondingly alters the plate potential level of the electrometer tube 415. As is shown in the drawings, the plate of electrometer 415, which is tied to the cathode of follower 425, is coupled directly to the grid of the first triode 55 of the delay multivibrator 60 by lead 55a; hence, the resultant negative shift of grid potential of this triode accordingly shifts the time phase of the trailing edge of output pulse N in closer to the leading edge thereof, and this continues until the time phases of tracking gate pulses Y and Z are adjusted to properly sandwich the selected target echo signal therebetween, thus providing a corrected measure of target range.

In addition to the above-discussed correction of delay multivibrator output pulse width, the present electrometer and memory circuit provides, through the charge trapped on side 409a of capacitor 409, a memory of selected target range and a measure and memory of the rate at which selected target range is varying, and on the basis of the previously observed rate of change of selected target range automatically anticipates alterations in the time phase of the trailing edges of pulses N relative to their leading edges required to maintain a correct target range measurement. These effects are accomplished by the inherent feature of the instant electrometer and memory circuit in providing an extremely high input impedance to the electrometer through the suppressor grid of pentode 415, enabling side 409a of capacitor 409 to retain the absolute charge impressed thereon through the feeder diodes 400 and 405 for a substantial time interval, and by the coupling of follower cathode and electrometer plate to the junction point 412 of the two series capacitors 409, 410 through the resistor 411. The potential level of the suppressor grid of the electrometer 415 controls the potential level of the cathode of the follower 425 and the plate of electrometer 415. The absolute charge on side 409a of capacitor 409 first controls the potential level of the voltage drop across the electrometer pentode and hence provides the measure and memory of target range. The potential level of the electrometer plate and follower cathode relative to ground in turn controls the rate of current flow through the resistor 411 between the follower supply and the capacitor 410 through the junction 412. Therefore, when no signals UU and WW are obtained, or the signals UU are equal in power to the signals WW, assuming that the missile had been approaching closer to the target, the potential level of the potential drop established on capacitor 409 by the charge on side 409a thereof and the level of the suppressor grid of electrometer 415 are continuously driven in a negative direction as electron current is conducted to the series capacitors 410, 409 from the cathode supply of the follower and accumulated on capacitor 410, to close the trailing edges of the delay multivibrator output pulses N toward their leading edges. When the current flow between the cathode supply of the follower and the series capacitors is adjusted to the proper rate by the building up of the proper absolute charge on side 409a of capacitor 409, and with an appropriate R-C value chosen for this circuit in contemplation of the expected condition in use of the system, the automatic action of the electrometer circuit without further input to the capacitor 409 from the feeder diodes causes a rate of change of grid voltage of triode 55 which provides that rate of change of the position of the trailing edges of the delay multivibrator output pulses N, with relation to their leading edges, which corresponds substantially to the rate at which the tracking circuit has found the target range to be changing. As stated above, the absolute charge established on side 409a of the capacitor 409 from the feeder diode circuitry controls the rate at which the grid potential of the triode 55 is changed by action of the rate memory here discussed. Thus, if the rate of change of target range is increased from a particular established rate during automatic tracking operation of the instant device, the output of the appropriate gated amplifier obtains a higher power level than that of the other to accordingly alter the charge on side 409a of capacitor 409 through the feeder diode circuitry. This change in charge accordingly alters the potential levels of the cathode and plate of the electrometer 415 and cathode of the follower 425, causing an instantaneous change in the grid bias of multivibrator triode 55. The potential difference between electrometer plate or follower cathode and ground is accordingly altered to change the rate of current flow through resistor 411, thus altering the rate memory or rate of change of suppressor grid potential of electrometer 415 and of the grid bias on triode 55. In the loop thus established, the absolute charge placed on side 409a of capacitor 409 through the feeder diode circuitry thus controls not only the grid potential of delay multivibrator triode 55, but also the rate at which it is automatically changed as the missile closes in on the target.

The electrometer and memory circuit therefore accomplishes two functions, the first being to position the time relationship of the trailing edges of the delay multivibrator output pulses N to their leading edges when a range tracking inaccuracy occurs, and the second being to establish the proper rate of change of the grid potential of delay multivibrator triode 55 to anticipate changes in selected target range as indicated by the previous tracking rate. Once a uniform range tracking rate is obtained, it is thus seen that range tracking can continue automatically for a period of time despite a temporary failure of selected target echo signal reception. The continual reception of echo signals provides a check on the range tracking rate already established, to alter the same should it be found in error, as may result from changes in actual range tracking rate or tracking errors from inherent limitations of the circuitry itself.

In the preceding discussion relating to the conditions established on the electrometer and memory circuit, it was stated that the screen grid to cathode potential difference of the electrometer pentode 415 is fixed on the assumption that the plate to grid potential of the cathode follower 425 is substantially fixed. To show that the plate to grid potential of the cathode follower 425 is fixed, it is to be noted that the cathode follower plate is coupled to a positive supply through channel 426, while the cathode of this follower is coupled to a negative supply through resistors 417 and 419. In the absence of any variable, it is apparent that the plate to cathode potential of the follower is thus fixed, and since it is a cathode follower, the plate to grid potential thereof must likewise be fixed. But as previously pointed out, the absolute cathode potential level does vary as an inherent result of the operation of the electrometer and memory circuit. However, it will be recalled that variations in the cathode potential level of the follower 425 result in corresponding variations of the grid potential of the delay multivibrator triode 55, and consequent variations in the power of the delay multivibrator output pulses N. The output pulses N obtained from the delay multivibrator 60 are coupled through an integrating network (FIG. 8) comprising resistor 427, resistor 428, and capacitor 429 to the plate of the cathode follower 425. As the cathode of the follower is moved in a more negative direction, so the output pulses N of the delay multivibrator are correspondingly reduced in power, and vice versa. Consequently, due to the action of the integrating network upon the pulses N obtained from the delay multivibrator, as the cathode of the follower 425 moves in a negative direction the potential level of the plate thereof, as established by the combination of the positive supply and integral of pulses N, likewise moves in a negative direction by a substantially similar amount, and the inverse is obviously true as the follower's cathode potential level is caused to move in a positive direction by action of the electrometer and memory circuit. Since the plate to cathode potential difference and plate to grid potential difference of the follower 425 are maintained substantially fixed, the screen grid to cathode potential difference of the electrometer pentode 415 is accordingly maintained at a substantially fixed value, as stated early in this description in establishing the conditions imposed upon the elements of the electrometer circuit for obtaining the results desired from it.

The foregoing discussion of the Tracking Unit is based on the assumption that a particular target has been selected, and it has been shown that once a target is so selected the circuit locks onto this target and selectively tracks it in range, thereby excluding all other received echo signals from its operation. There must therefore be provided some means whereby a target may be initially selected prior to launching of the missile. For this purpose a slew switch 430 (FIG. 9) is provided in the plate circuit of the feeder diode 405, interposed between said plate and capacitor 409. With this switch closed to contact 430b, operation of the circuit as afore-described is accomplished; however, with the switch 430 closed to contact 430a, connection is had between the side 409a of capacitor 409 and an externally controlled variable voltage supply (not shown). Through this supply, various desired voltages may be applied across capacitor 409 and to the suppressor grid of the electrometer tube until, by observation of a monitor oscilloscope (whose functions in conjunction with the various units of the instant control system will be indicated upon completion of the detailed description of the system), it is determined that the electrometer and memory circuit output voltage is properly time phasing the tracking gates to sandwich therebetween and received radar echo pulses of a desired target. The switch 430 may then be closed to its contact 430b, to effect the above-described automatic range tracking of this selected target under the corrective control of the Tracking Unit. A slew relay 430c, manually controlled at the monitor, may be utilized to accomplish this switching between slew control and automatic tracking.

It can be seen, therefore, that the time phases of the trialing edges of the delay multivibrator outputs N, and accordingly of the leading edges of the cathode follower outputs or range pulses R, are continually adjusted into a fixed time relationship to the reception of selected target echoes by variations in the grid bias of triode 55 in the delay multivibrator 60. This adjustment is accomplished by the output of the memory and electrometer circuit, which is in turn under the control of the plate outputs of the early and late gated amplifiers 95 and 100. Thus, the time phases of the trailing edges of the delay multivibrator outputs N, of the leading edges of the cathode follower outputs or range pulses R, and of the pulses X and W, each continually represent, when compared with the time phases of the corresponding transmitted pulses, as determined by the modulator triggers H, and the time phases of the corresponding pretrigger pulses C, the range of a selected target on which the tracking circuit has been locked by the initial setting of the electrometer and memory circuit output through the slew voltage to properly sandwich in time a desired target echo signal between the early and late tracking gates Y and Z.

Range Switching Unit

In many guided missile applications it is frequently desirable to provide for initiation of particular chosen functions at predetermined missile to target ranges. For example, as mentioned earlier in the specification, the specific embodiment of the control system here disclosed is designed to direct the missile on a pursuit course to the target over the major portion of its air flight, but to convert missile navigation to substantially a collision course over the terminal portion of its flight. In the present embodiment, the derivation of collision course information is obtained by the Integrating Unit from bearing information had from the Directional Unit, both Units to be subsequently described, but initiaion of operation of the Integrating Unit and collision course navigation resultnig therefrom is effected by the Range Switching Unit at a desired missile to target range. Also, since the basic function of the missile for which the instant control system is designed is to deliver by air flight an underwater sonic homing torpedo payload into the vicinity of a selected target, the present Range Switching Unit accomplishes the further function of releasing the payload from its air flight carrier upon the missile reaching a second desired predetermined range from the selected target.

To accomplish range switching for the purposes above stated and for other purposes that may be deemed desirable for missiles having various functions and tasks, the instant Range Switching Unit operates generally in the following manner, as represented by the schematic functional diagram FIG. 5. In producing a 5 mile target range switching action, for example, for initiating operation of the Integrator Unit and collision course or proportional navigation, the modulator trigger pulses H are applied simultaneously with their application to output 42 to an R-C differentiating circuit 161, 162 through channel 42a and converted to the wave forms generally indicated by AA. The negative going portion of each wave form AA is formed to provide a desired time interval, and is utilized to control the 5 mile gate generator 160, producing thereby a series of square wave gates BB at the cycling rate of control system operation, having desired time durations. The time constant of R-C differentiating circuit 161, 162 is appropirately adjusted so that the time phase of the trailing edge of each gate BB with respect to the corresponding modulator trigger pulse H is such as to provide a measure in time of the range at which it is desired that a switch 170 be activated, being in the instant case chosen as a 5 mile range.

As further indicated in the block diagram FIG. 5, the gates BB are applied to the switch 170 along with the corresponding range pulses R, which it will be recalled emanate from the Tracking Unit, and whose leading edges provide a measure of actual target range when compared in time with the modulator pulses. 5 mile switch 170 is preferably a gas tube utilized as a coincidence measuring circuit, and as the missile closes in on the target it is apparent that the leading edges of pulses R close in to time phase with the trailing edges of corresponding gates BB. With the time phases of the trailing edges of gates BB properly adjusted, at a desired actual target range the leading edges of pulses R come into coincidence therewith, and the switch gas tube 170 is thereby fired to energize a relay or the like 174, accomplishing the action necessary for activation of the Integrator Unit at the desired target range, or whatever other function may be desired at this range.

Since in its general aspects the operation of the ½ mile range switch circuit comprising R-C differentiator 182, 183 providing wave forms CC, ½ mile gate generator 180 providing gates DD, ½ mile switch 190, relay 191, and in addition thereto clamping diode 181, is the same as the above-described 5 mile range switch circuit, a functional discussion thereof is unnecessary.

Considering a specific circuitry embodiment of the Range Switching Unit in detail with reference to FIG. 7, the modulator trigger pulses H in being applied to the 5 mile gate generator 160 are differentiated into the wave forms generally indicated as AA by an R-C differentiating circuit including capacitor 161, resistor 162, and the 5 mile gate generator 160. Generator triode 160 is normally biased to be conducting, so the application of the modulator trigger pulses H to the grid thereof results in a high grid current for the leading edge portions thereof, thus providing a low resistance in the R-C differentiating circuit and resulting in a short time constant therefor during this portion of each pulse; however, upon the following application of the trailing edge portions of triggers H to that grid, conduction through triode 160 is cut off and the large resistor 162 provides the resistance portion of the R-C differentiating circuit, thus resulting in a long time constant therefor. The resultant signals on the grid of triode 160 are therefore that indicated by wave forms AA. Since the negative going pulse portion of each wave form AA drives the grid potential of triode 160 below its cut off value, and since this negative going pulse has a substantial time duration as determined by the time constant obtained from capacitor 161 and resistor 162, a series of pulses of generally square wave form BB is obtained in the plate circuit of the 5 mile gate triode 160. As is readily apparent therefore, the time phase of the trailing edge of each pulse BB with relation to the corresponding modulator trigger pulse H, or the time duration of each pulse BB, is controlled by the discharge time constant of the R-C circuit. Therefore, by making resistor 162 variable, the time duration of pulses BB may be accordingly adjusted as desired.

Each pulse BB is coupled through the capacitor 163 and across the resistor 164 to the screen grid of a 5 mile switch gas tetrode 170. Referring to the square wave range pulses R, which it will be recalled are obtained in channel 74 as the output of cathode follower triode 70, they are applied in channel 171 through capacitor 172 and across resistor 173 to the control grid of the 5 mile switch gas tetrode 170. The normal bias on gas tetrode 170 and the amplitudes of pulses R and BB are such that it requires coincident application of these pulses to the grids of tube 170 to fire the same, and upon its being fired the relay 174 is energized to initiate proportional navigation by activating the Integrator Unit to be subsequently described.

Since as previously described, the time phase of the leading edge of each pulse R with relation to the corresponding modulator trigger pulse H represents a measure in time of the selected target's range, and since the trailing edges of pulses BB are adjustable in time through variable resistor 162, to obtain 5 mile switching action the widths of pulses BB are adjusted to provide a trailing edge on each pulse delayed from the corresponding radar pulse transmission by a time equivalent to substantially 5 mile target range. Under these conditions, when 5 mile target range is actually obtained, the leading edges of pulses R come into time coincidence with the trailing edges of corresponding pulses BB, thus firing the gas tetrode 170 to energize relay 174 and effect the desired switching action in the Integrator Unit.

The ½ mile switching circuit is in electrical parallel relationship to the above-described 5 mile switching circuit with reference to the modulator trigger output pulses H and the range pulses R from the cathode follower 70, and operates in a similar manner. The modulator trigger pulses H in being applied to the grid of the ½ mile gate triode 180 are differentiated into wave forms CC in the same manner as in the 5 mile switching circuit by an R-C circuit comprising capacitor 182, variable resistor 183, and triode 180. The differentiated forms CC of the modulator trigger pulses H act upon the ½ mile gate triode 180 to produce pulses DD in the plate circuit of this triode. Since the width of pulses DD must be small in order that their trailing edges may denote in time a range as small as ½ mile, variable resistor 183 must be considerably smaller than variable resistor 162. The only significant difference between the 5 mile switching circuit and the instant ½ mile switching circuit flows from this fact, which necessitates the positioning of clamping diode 181 in the grid circuit of triode 180, in order that grid current through the triode may be limited in value by conduction through the clamping diode 181 to prevent injury to the triode.

As in the 5 mile switching circuit, in the ½ mile switching circuit the square wave pulses DD are applied through the capacitor 184 and across the resistor 185 to the screen grid of the gas tetrode ½ mile switch 190. The range pulses R applied to the control grid of gas tetrode 170 through channel 171 are also coupled through capacitor 172 and across resistor 173 to the control grid of gas tetrode 190, and as in the case of tetrode 170, tube 190 is fired only during time coincidence of pulses DD on the screen grid with pulses R on the control grid thereof. Thus, when the time phase of the trailing edges of square wave pulses DD are adjusted by means of variable resistor 183 so that time phase relative to the corresponding modulator trigger pulses H which denotes substantially ½ mile target range, the ½ mile switch tetrode 190 is fired when the leading edges of pulses R are also at that time phase which denotes actual ½ mile target range, energizing the ½ mile relay 191, or the like. The purpose of the ½ mile relay 191 in the instant embodiment is to terminate the air flight mission of the missile by releasing the payload of the missile by any suitable means, such as explosive bolts, thereby enabling water entry and terminal attack on the target in the case of a sonic homing torpedo payload.

*Selector Unit*

Turning next to a consideration of the Selector Unit, it would be advantageous at this point to recapitulate briefly as to the significance of range pulses R obtained from the cathode follower 70, and of early tracking gate triggers W derived therefrom and providing a 2.0 microsecond delay from the leading edge of corresponding pulses R. In the overall operation of the Tracking Unit, once the proper bias has been established upon the grid of triode 55 of the delay multivibrator 60 so as to precisely sandwich in time each selected target echo signal between the corresponding early and late tracking gates Y and Z, which gates are in themselves time referenced to the triggers W and X therefor, any variations in target range that may subsequently occur result in corresponding changes in the time phases of pulses W, and likewise of pulses X, with relation to delay multivibrator triggers M, through the action of the electrometer and memory circuit upon the delay multivibrator bias, to re-establish the desired sandwiched condition of the selected received signal pulses between the early and late tracking gates. The loop thus established in the Tracking Unit therefore effectively locks the time phase of triggers W, which have a fixed time relationship to corresponding leading edges of pulses R, to the range of the selected target. As the selected target's range varies, the target is thus tracked in or identified by range. The triggers W may therefore be looked upon as presenting substantially the times at which the leading edges of the corresponding received selected target echo signals are obtained by the radar received.

The primary function of the Selector Unit is to utilize triggers W in conjunction with pulses R to derive an amplified pulsed output representative of the powers of the selected target's echo signals, to the exclusion of all other targets within the sensing system's field of vision. As indicated in the introduction to the present specification, were radar echo pulses from a target are received sequentially from two angularly displaced directions of preferential reception, and if the two sets of received signals are commutated and their power contents compared, the power discrepancies therebetween represent the difference between the radar receiving antenna heading and target bearing therefrom. The Selector Unit therefore functions to select the desired received radar signals from all received signals, to amplify the power contents thereof while maintaining the voltages a function of received echo voltages, and pass the amplified signals thus obtained to the Directional Unit. The received radar signals as obtained from both directions of preferential reception sequentially, are applied to the same Selector Unit circuit, commutation thereof and power content comparisons being performed in the Directional Unit to be subsequently described.

In addition to the foregoing primary function of the Selector Unit, it provides an output for marking the range on a cathode ray tube of a monitor, or the like, utilized prior to release or launching of the missile, indicative of that range at which the tracking gates Y and Z are set. Also, the Selector Unit includes an automatic gain control (AGC) circuit responsive to the amplified selected target radar echo signal amplitude or voltage level, to effect proper adjustment of the radar receiver I-F amplifier for maintaining the selected signal output of the Selector Unit within desired limits.

Referring to the schematic functional diagram FIG. 4, it can be seen that the early tracking gate triggers W, whose leading edges are in substantial time coincidence with the leading eges of resultant early tracking gates Y, in addition to being applied to the tracking gate generator 85 (FIG. 3) are applied over channel 201 to a selector gate generator 200, from which results a series of positive going pulses EE and negative going pulses KK. Neglecting the pulses KK for the present, and following pulses EE, they are applied to a coincidence measuring selector tube 210 along with all the received radar echo pulses FFF obtained from the radar receiver through received signal input 211. Thus, only that echo pulse from each pattern FFF in time coincidence with the corresponding pulse EE is delivered from selector 210 as pulse FF, whose amplitude is a function of the particular selected target echo pulse signal from which it is derived, and whose leading edge is in substantial time coincidence with that of corresponding trigger W.

Digressing for a moment, it will be recalled that pulses R obtained along channel 74 have leading edges whose time phases precede that of corresponding triggers W or pulses FF by approximately 2 microseconds, and each has a time duration of approximately 60 microseconds. These pulses R are coupled through line 221 to inverter 220, from which is obtained a negative going output of pulses GG having the same time phase and time duration as corresponding pulses R. Just prior, then, to the application of each pulse FF to signal diode 215, a corresponding pulse GG is applied to stretching diode 227. The circuit arrangement of diodes 215 and 227 is such that pulses FF and GG causes pulses HH to be produced and applied to the signal amplifier 230. The amplitudes of pulses HH are determined by pulses FF, while the time durations thereof are fixed and controlled by the longer pulses GG. Pulses HH are inverted and amplified in amplifier 230, and applied as pulses II to the Directional Unit through channel 231. The double amplitude representations of pulses FF, HH, and II denote a difference in power content of the selected echo pulses when received from the two directions of preferential reception, as indicated by the double amplitude of pattern FFF, and as discussed previously.

In addition to selecting and amplifying the desired target echo pulse for the Directional Unit, the Selector Unit functions to mark the range position or indication of the tracking gates Y and Z for a monitor, to enable the proper selection of slew voltage in the Tracking Unit. In marking the range setting, the second series of pulses KK obtained from the selector gate generator 200, whose leading edges are in time coincidence with those of corresponding triggers W, is applied to marker step generator 235 to provide a corresponding series of marker step waves LL, each having a small step and long decay slope after the step, as shown in the drawings. Marker steps LL are combined in the video mixer 240 with the received radar echo signals FFF, obtained at received signal input 211, to provide an output GGG at video output 243. It will be noted that the pattern of output GGG is the same as input FFF, except that the last pip is at an elevated voltage from the base line of GGG. Since marker steps LL have their leading edges in time phase with corresponding triggers W, pattern GGG indicates that the early tracking gates Y are in coincidence with the leading edges of the last pips of received signal patterns FFF, and hence, this target is substantially sandwiched between the tracking gates Y and Z. Output GGG is preferably coupled to a monitor cathode ray tube in the mother craft, so that the operator can observe the phase of the tracking gates with relation to a desired target as he adjusts the slew voltage, described in discussing the Tracking Unit. Thus, prior to release of the missile the tracking gates can be properly placed on a desired target echo, and after throwing of the slew relay to automatic tracking, the effectiveness of automatic tracking can be observed through this mixed video output pattern GGG.

To obtain automatic gain control of the radar receiver, the Selector Unit is further provided with an AGC circuit comprising AGC diode 250, AGC follower 255, and AGC base clamp 260. This circuit is responsive to the amplitude of pulses II to provide a D.C. output at 258 in response thereto for controlling the grid bias of a radar receiver I.-F. amplifier or the like. If the amplitudes of pulses II exceeds a desired value determined by the circuit of diode 250, a D.C. output is obtained from follower 255 to provide the appropriate change in radar receiver amplifier bias, reducing the amplitude of received video signal input FFF and hence returning pulses II to within a desired level. Also the AGC output is limited in the other direction; that is, the AGC output is limited from exceeding a desired value by the base clamp 260, to prevent received echo signal amplification beyond a desired factor.

Considering a detailed circuit embodiment of the Selector Unit, reference is had to FIG. 10. The early tracking triggers W are coupled by channel 201 to the grid of the selector gate generator gas triode 200 through capacitor 202 and across resistor 203. Each pulse W triggers the gas triode 200 to conduction, and this tube continues to conduct for 0.5 microsecond as determined by the pulse forming line 204 in the plate circuit thereof, whereupon the triode 200 is extinguished because the normal bias thereon is unable to sustain conduction therethrough. As a result of this conduction through the tracking selector gate generator 200, the series of square wave pulses EE are obtained at the cathode thereof, whose leading edges are in time coincidence with the application of the corresponding triggers W to the grid of triode 200, and whose time durations are substantially 0.5 microsecond.

Pulses EE are transmitted through channel 205 to the selector pentode 210, being coupled to the suppressor grid thereof through capacitor 206 and across resistor 207. The control grid potential of selector pentode 210 is established by the radar received signals, the video counterparts thereof FFF being applied to the received signal input 211 and coupled to said control grid through capacitor 212 and across resistor 213. Selector pentode 210 is normally at or below cutoff potential, and time coincidence between the application of a pulse EE to the suppressor grid thereof and the application of a received signal pip to the control grid thereof is required before the selector pentode can conduct. It can thus be seen that of the several target signals received by the radar system in each repetition cycle, only that signal representative of that target which is being tracked in range by the Tracking Unit can be in time coincidence with the pulses EE and thus provide conduction through the pentode 210. This conduction through the pentode, as can be readily seen, results in a negative pulse FF in the plate circuit for each selected target signal, whose amplitude is determined by the pentode's control grid potential and is thus made a function of selected target signal amplitude. Pulses FF are applied to the cathode of signal diode 215.

Digressing at this point and referring to pulses R obtained at the cathode output of the cathode follower triode 70 (FIG. 8), it was previously mentioned that pulses R are applied to the Selector Unit along with other units of the present system. The pulses R transmitted along channel 74, in being applied to the Selector Unit, are coupled to the inverter triode 220 by channel 221, through capacitor 222 and across resistor 223. The inverter triode 220 is normally biased at or below cutoff potential, but the application of each positive pulse R thereto results in conduction therethrough to provide a pulse GG in the plate circuit thereof, which is the inverted counterpart of the applied pulse R. As established by the time relationship of triggers W to the leading edges of corresponding pulses R, the latter are 2 microseconds ahead of the former and hence substantially 2 microseconds ahead of the leading edges of pulses FF obtained in the plate circuit of the selector pentode 210. Since the plate of stretching diode 225, to which the pulses GG are applied when present, and the cathode of signal diode 215 are coupled to the same voltage source, there can be no conduction through these two diodes under steady state condition of the Selector Unit once the series capacitors 226 and 227 are charged through the diodes; and since just prior to the application of each negative pulse FF to the cathode of signal diode 215 the corresponding negative pulse GG is applied to the plate of stretching diode 225, the conduction that results through the signal diode from the pulse FF is not transmitted through the stretching diode while the plate thereof is accordingly driven negative. The current flow through signal diode 215 as a result of each pulse FF therefore discharges capacitors 226 and 227 to some extent, and this change of charge is maintained for the duration of the corresponding pulse GG. However, upon termination of the particular pulse GG, the plate of stretching diode 225 returns to its normal potential level, and conduction then results therethrough to recharge capacitors 226 and 227 to their initial level. As a result of the described interaction of these two diodes, a series of negative going pulses HH is applied to the grid of signal amplifier triode 230 across resistor 228. Since the selected received signal pulses and the pulses EE are but a few microseconds in duration, the pulses FF are correspondingly of a short duration; but as previously described, the stretching gate triode 65 in the Tracking Unit provides a relatively long time duration for the pulses R, in the order of 60 microseconds. Therefore, the magnitude of each of the above changes in charge impressed across capacitors 226 and 227 is determined by the amplitude of the particular pulse FF, in turn controlled by the amplitude of the particular selected received signal, while the time duration of this change is determined by the 60 microsecond pulse GG. Thus, pulses HH applied to the grid of the signal amplifier 230 have a voltage amplitude established by the selected echo pip of pattern FFF, but are power amplified in time by the duration of pulses GG.

The signal amplifier triode 230 inverts and voltage amplifies the pulses HH to provide a series of pulses II in its plate circuit. It can thus be seen that the pulses II are a voltage and time amplified representation of the selected target received echo signals, whose voltages are a function of corresponding selected target received echo signal voltages, and whose leading edges are substantially in time coincidence therewith. These pulses II are fed through channel 231 to the Directional Unit, to be subsequently described.

The above-discussed marker step circuit incorporated in the Selector Unit comprises the plate circuit of the selector gate generator 200, the marker step generator triode 235, and video mixer triode 240. As a result of the application of triggers W to the grid of the gas triode 200, in addition to the square wave pulses EE produced at the cathode of this triode, pulses of general form KK are produced simultaneously at the plate thereof, and are coupled through the capacitor 237 and across the resistor 238 to the grid of the marker step generator 235. The normal bias on triode 235 is such as to make it conducting; but upon the application to the grid thereof of each negative going pulse KK, the marker step generator is immediately cut off to provide at its plate a wave form generally indicated by the step wave LL. The quick cut off of marker step generator 235 is represented by the short step leading edge of wave form LL, whereas the long time constant of the coupling circuit comprising capacitor 237 and resistor 238 results in a long plateau on the wave form LL having a gradual decay as the triode 235 begins to conduct.

As previously pointed out, triggers W are in time phase with the leading edges of the corresponding radar received target echo pulses being tracked. Since the leading edges of pulses KK are in time coincidence with triggers W, the leading edges or short steps provided in wave forms LL are therefore also in time coincidence with the corresponding leading edges of the selected target echo signals obtained by the radar system. The radar received echo signals obtained in video form by this Selector Unit at the received signal input 211 and indicated as FFF, are coupled through the capacitor 241 and across the resistor 242 to the grid of the video mixer triode 240. Each signal so received is thereby coupled into the cathode circuit of the video mixer and consequently coupled with the plate output of the marker step triode 235. While triode 235 is conducting, each relatively transient radar echo signal received does not substantially affect the tube operation because of the provision of the by-pass capacitor 236 to ground in parallel with the load in the cathode circuit thereof. Each received pulse is nevertheless delivered at the mixed video output 243, to which is added voltagewise the marker step wave form LL when present. When these mixed signals are applied to a cathode ray tube of the monitor, the leading edge of the marker step appears in time coincidence with the leading edge of the selected target signal pip, and thereby provides a visual demarcation of that pulse selected and being tracked, as illustrated by wave form GGG.

The other feature of the Selector Unit above referred to is the automatic gain control incorporated therein for limiting the amplification of the received signal, preferably in the radar receiver I-F amplifier, so that the I-F and video forms of the received signals and the amplitudes of pulses II do not surpass a desired value as the missile approaches closer and closer to the target, and as the echo signals become stronger and stronger. For this purpose the signals II produced in the plate circuit of the signal amplifier 230 are coupled to the plate of an automatic gain control diode 250 through the capacitor 251 and across the resistor 252. A back bias on this diode is so chosen to match the desired maximum amplitude of signals II, so that whenever the amplitude of a signal II, which it will be recalled is controlled by the amplitude of the corresponding selected target received video signal, exceeds the desired value, the diode conducts to charge capacitor 251. After the passage of such pulse II, the capacitor 251 discharges in part through resistor 253 to establish a charge on capacitor 254, the latter capacitor being coupled to the grid of cathode follower triode 255. Thus, as the signal II exceeds a desired amplitude, the automatic gain control voltage obtained at output 258 for application to the I-F amplifier provides increasingly negative outputs as tapped off from the voltage divider comprising resistors 256 and 257 in the cathode circuit of the follower 255, thereby driving the bias on the I-F amplifier in a negative direction to decrease the amplitudes of video signals FFF applied to the control system, hence reducing the amplitudes of subsequent pulses II until the amplitudes of the latter pulses are reduced to or below the value established by the back bias on the automatic gain control diode 250. In order to provide a limit or base which the automatic gain control voltage output obtains in the positive direction, an automatic gain control base clamp diode 260 is provided with its plate coupled to the cathode of the follower 255, so that the cathode potential of triode 255 cannot move in a positive direction passed ground potential due to resultant conduction through and low resistance of diode 260.

*Directional Unit*

Turning to the Directional Unit, with the aid of pulses R this unit commutates the two sets of selected pulses II, obtained from the Selector Unit on channel 231, into two channels representative of the two directions of preferential radar echo reception, compares the average power contents of the two commutated sets of echo pulses, and accordingly provides a measure of discrepancy between antenna heading and actual target bearing. Additionally, the Directional Unit controls the sequential action of the radar system in effecting the desired pattern of alternating the two directions of preferential radar echo reception.

With reference to the schematic functional diagram FIG. 6, each of the square wave pulses R, which it will be recalled has a leading edge slightly ahead in time of the corresponding early tracking gate and is approximately 60 microseconds in duration, is converted into the wave form MM by differentiator 266, 267, the negative going or latter portion of which is utilized to trigger the alternating diodes 265, 270. These diodes function in turn to trigger a scale of two trigger circuits 290, comprising left scanning generator 275 and right scanning generator 280. The trigger circuit functions to provide two outputs indicated at OO and PP, each of which alternates in polarity with the application of each wave form MM to the diodes 265, 270, this polarity alternation thus being at the same frequency as radar pulse transmission. The outputs OO and PP are amplified and inverted into outputs RR and SS by the left and right scanning amplifiers 310 and 320 respectively, and coupled through taps 311 and 321 to the radar system. The polarity of the left and right scanning outputs are used to control which of the two directions of preferential radar reception is employed in each radar cycle, through any means known to the radar art, such as switch tubes, and thus effect the desired alternation in direction of preferential reception in accordance with the polarity alternations of the scanning outputs. The time relationship of the trailing edges of pulses R, from which originate the latter or negative going portions of wave forms MM, to the radar modulator trigger H and the reception of the selected target echo signals is such that each alternation of preferential radar reception direction occurs slightly later in each radar repetition cycle than the time of selected echo reception, and thus adequately in advance of the initiation of each subsequent radar cycle to insure stabilization of the radar reception system prior to reception of each subsequent echo pulse, even though the target be at close range. Furthermore, because of the substantial time delay afforded between the leading and trailing edges of pulses R, complete reception of each selected echo signal is assured prior to switching of the direction of preferential reception.

The left and right scanning generator outputs OO and PP are further applied through channels 278 and 283 respectively to control the action of right and left commutators 340 and 330 respectively; while all selected signal outputs II from the Selector Unit are coupled through channel 231 and distributor 350 to both commutators simultaneously. The circuit is so designed that the response of the radar system to scanning outputs RR and SS, and the response of the commutators to scanning generator outputs OO and PP are such that: when radar reception is being had from one preferential direction (left of antenna center, e.g.), only one commutator (left, 330) passes the distributor output; while when radar reception is had from the other preferential direction (right of antenna center, e.g.), only the other commutator (right, 340) passes the distributor output. The selected target signals are thus commutated into two channels in accordance with that direction, of the radar system's two directions of preferential radar reception, from which a particular echo pulse is derived. The commutated pulses are then averaged on capacitors 331 and 332, and the difference in average energy levels of the signals obtained in one channel as compared with those in the other channel may be amplified by differential amplifier 370. The difference between the two directional outputs obtained at taps 381 and 391 of amplifier 370 indicates the amount of discrepancy between antenna heading and selected target bearing, and the direction of this difference indicates the direction of this discrepancy. The outputs at taps 381 and 391 of differential amplifier 370 may be used to control the missile heading by any means known to the art, as by positioning a gyroscopically stabilzed antenna which in turn provides signals appropirate for a missile autopilot, examples of which are described in the copending applications of Perry R. Stout, Harold K. Skramstad, Theodore C. Merkle, Emmett C. Bailey, Wesley Spangenberg, Jacob Rabinow, and Charles Raudenbush for An Object Tracking Antenna and System of Missile Guidance, Serial No. 219,106, filed April 3, 1951, and of Harold K. Skramstad, Charles Raudenbush, and John A. Hart for Autopilot, Serial No. 266,978, filed January 17, 1952, now U.S. Patent No. 3,011,738, granted December 5, 1961.

Considering the specific Directional Unit circuit embodiment shown in FIG. 11, each square wave pulse R obtained from channel 74 is coupled through capacitor 266 and resistor 267 to the cathodes of two alternator diodes 265 and 270, to trigger an Eccles-Jordan type scale of two trigger circuit 290. The R–C input to the diodes 265 and 270 is a differentiating circuit and converts each square wave pulse R into its differentiated form indicated by the wave form MM. Since in the practical operation of trigger circuit 290 perfect balance thereof is not obtained, one of the scanning generator triodes 275 or 280 is conducting from its cathode to its plate, and for the purposes of example the output forms therefor indicated in the drawings (see FIG. 6) show scanning generator triode 280 in the state of conduction while scanning generator triode 275 is cut off. With trigger circuit 290 in this state, the plate of alternator diode 270 is more positive than the plate of the other alternator diode 265; and upon the application to this circuit of a pulse R in the differentiated form MM, it is apparent that greater conduction from the negative pulse of wave form MM is going to be had through diode 270 than through diode 265. The grid of scanning generator 280 is therefore driven in a negative direction by a greater amount than is the grid of scanning generator 275. As the grid of scanning generator triode 280 is driven negative, conduction through this triode is diminished and the plate circuit thereof is driven in a positive direction, thereby driving the grid of scanning generator triode 275, coupled to the plate of 280, in a positive direction to initiate or to increase current flow therethrough, hence driving its plate in a more negative direction, which in turn causes the grid of scanning generator triode 280, coupled to the plate of 275, to swing still more negative in response thereto. The net result of thus upsetting the existing state of this circuit 290 is to place scanning generator triode 275 in a state of conduction while scanning generator triode 280 is cut off. It is apparent, therefore, that upon the application of each pulse R to the Directional Unit, the condition of scanning generator triodes 275 and 280 is reversed as a result of the action of the negative pulse of wave form MM upon the alternator diodes 265 and 270. Consequently, the plate circuits of the scanning generator triodes are provided with outputs OO and PP which alternate in polarity at the radar repetition frequency determined by master oscillator 10, in the instant embodiment at the rate of 1800 cycles per second.

It has been found desirable to include a self-biasing network, as indicated by the resistor 268 shunted by the capacitor 269, in the cathode circuit of the alternating diodes 265 and 270. The time constant of this self-biasing network is so chosen that as a series of pulses R is fed to the differentiating circuit 266, 267, only a small peak portion of each negative pulse of wave form MM is passed by the diodes. Otherwise, if a major portion or all of each negative pulse were passed, the grid of the non-conducting scanning generator triode may be driven sufficiently in a negative direction by the pulse that the equilibrium of the trigger circuit would not be sufficiently upset to obtain the desired scale of two action therefrom.

For the purposes of illustration, the discussion as to the remainder of the Directional Unit is based on the situation when output OO, obtained at the plate of the scanning generator triode 275, is positive going and output PP, obtained on the plate of the scanning generator triode 280, is negative going, it being understood that the action of the trigger circuit 290 is such as to alternate the plate polarities of the scanning generator triodes with the application of each pulse R to the alternating diodes. The output OO obtained at the plate of the scanning generator 275 is coupled in part through the capacitor 276 and across the resistor 277 to the supressor grid of left scanning amplifier pentode 310, and in part through channel 278 to the grid of the right commutator triode 340. Output OO, being positive going in the instant example, results in a negative going output RR at the plate of the left scanning amplifier 310. Simultaneously therewith, the negative going output PP of the right scanning generator is coupled in part through the capacitor 281 and across the resistor 282 to the suppressor grid of the right scanning amplifier pentode 320, and in part through channel 283 to the grid of the left commutator triode 330. Output PP, being negative going in the instant example, results in a positive going output SS at the plate of the right scanning amplifier 320. As previously stated, as conduction through the scanning generator triodes 275 and 280 alternates in sequence with the application of pulses R to the alternator diodes, radar reception is alternated thereby between the two directions of preferential reception, and it is assumed for the purpose of the present illustration that the scanning output which is positive going, as right scanning output SS, effects radar reception from that direction of preferential reception which it controls.

Turning to the pulses II obtained as the output of the signal amplifier 230 in the Selector Unit, they are applied along channel 231 through the capacitor 251 and across the resistor 252 to the control grid of the distributor pentode 350, where they are passed on in the plate circuit of the distributor pentode to the cathodes of the two commutator triodes 330 and 340. Since by the action of the trigger circuit 290, the grid of the right commutator triode 340 is driven in a positive direction when radar echo energy is being preferentially received from the direction controlled by the right scanning output, and in a negative direction when the echo energy is being received from the direction controlled by the left scanning output, and since the converse is true for the potential of the grid of the left commutator triode 330, a pulse II is passed through the right commutator triode 340 when this pulse is the result of a radar echo signal received from the preferential direction controlled by the right scanning output, and is passed through the left commutator triode 330 when this pulse is due to radar echo energy received from the preferential direction controlled by the left scanning output. Pulses passed through the left commutator 330 are averaged by the R-C circuit comprising capacitor 331 and resistor 331b, and the resultant potential obtained across said capacitor is applied to the grids of the triodes 375 and 380, forming one-half of the differential amplifier 370. Similarly, pulses passed by the right commutator triode 340 are averaged by the R-C circuit comprising capacitor 332 and resistor 332b, and the resultant potential obtained across said capacitor is applied to the grids of the two triodes 385 and 390, forming the other half of the differential amplifier 370. The potential across capacitor 331, controlling the grid potential of triodes 375 and 380, as compared with the potential across capacitor 332, controlling the grid potential of triodes 385 and 390, provides a measure of the difference in selected target radar echo energy strength obtained from the two directions of preferential reception, thus providing a measure of the amount of antenna off-target heading. This difference is then amplified by the differential amplifier 370. It is apparent that when the potentials across capacitors 331 and 332 are equal, the antenna heading is on the selected target and there is no amplified differential output.

In accordance with the foregoing explanations, therefore, the intelligence obtained at the Directional Unit output taps 381 and 391 indicates the instantaneous discrepancies between radar antenna headings and the bearing therefrom of the selected target being tracked and to be homed upon by the missile. As previously indicated, this information may be utilized to direct the missile on its homing course by appropriate circuitry and suitable missile course control elements controlled thereby that cause the missile and its antenna to seek a balanced output from the differential amplifier 370, or an on-target heading thereof. However, as is apparent, this type of control results in pursuit navigation or a pursuit homing course, which although sufficient for many guided missile applications does not enable collision course navigation when that is appropriate. As suggested earlier in this specification, the present control system does contemplate the provision of intelligence appropriate for effecting substantially collision course navigation of the missile, and this is accomplished by appropriate conversion of the intelligence gained at the output taps 381 and 391, or the equivalent intelligence had at R-C averaging circuits 331, 331b and 332, 332b, by an Integrator Unit.

*Integrator Unit*

Before considering the Integrator Unit, it is desired to point out that the directional output of differential amplifier 370, as results from the charges obtained across capacitors 331 and 332, may be considered as the missile heading error if the radar antenna is fixed in position with relation to the missile axis, as is possible. On the other hand, the radar antenna may be gimbal mounted and movable with respect to the missile axis, and further, may be gyroscopically stabilized independent of missile heading and gyrations; whereupon, the output of differential amplifier 370 would be utilized to precess the antenna gyroscope and thus function to keep the missile antenna locked onto the target. In this type of system, ferential voltages across capacitors 331 and 332 are indicative of antenna heading errors only; and the difference between antenna heading and missile heading, the missile heading error, may be determined by a potentiometer connection between the missile and antenna housing, providing a voltage signal indicative of actual missile heading error. A gimbal mounted antenna guidance system of the type here suggested is described in the above-identified copending application for An Object Tracking Antenna and System of Missile Guidance. The foregoing units of the present control system, which are sufficient for directing the missile on a pursuit course to a selected target, may be utilized with either a fixed or gimbal mounted antenna system. But where it is desired to direct the missile on a collision course through the operation of the above described system in conjunction with the instant Integrator Unit, a gimbal mounted antenna which is locked onto the selected target by the foregoing control system units is utilized.

Considering the Integrator Unit, its purpose, as mentioned, is to provide appropriate intelligence to an autopilot whereby the attack of the missile may be changed from a pursuit course derived from the Directional Unit output, to substantially a collision course. This is accomplished by integrating the stabilized antenna heading errors or required changes in antenna heading as obtained from the Directional Unit in the form of voltage differences existent across capacitors 331 and 332, and summing this integrated value with the missile heading error signals derived from the differences between antenna headings and missile headings, thereby injecting a navigation lead into the net control system output intelligence to the autopilot. By proper engineering design of the Directional Unit and Integrator Unit, as will be apparent to those skilled in the art, the missile may thus be directed by the autopilot to fly substantially a collision course to the target, the lead angle being determined by the Integrator Unit output and being cancelled in effect on the autopilot by that missile off-target heading signal which results from the missile attaining the integrator determined lead angle.

For an understanding of the operation of the Integrator Unit per se, reference is first had to the schematic functional diagram FIG. 6. The pulses R, obtained from the Tracking Unit on channel 74, are utilized to remodulate the D.C. voltages from capacitors 331 and 332 of the Directional Unit, obtained as inputs to the Integrator Unit along lines 331a and 332a. In being applied to the Integrator Unit, the pulses R are first inverted by gated current amplifier 450 to provide negative going pulses AAA. Pulses AAA are then applied to remodulation amplifiers 455 and 460 simultaneously with the application thereto of the D.C. voltages obtained across capacitors 331 and 332, respectively. The instantaneous D.C. antenna heading error error outputs are thereby remodulated into pulses BBB and CCC, respectively. These latter pulses, whose amplitude differences are a function of instantaneous antenna off-target headings, are differentiated at 456 and 461, respectively, into wave forms DDD and EEE. The positive going portions of wave forms DDD and the negative going portions of wave forms EEE are integrated on integrating capacitor 468, with integrator diodes 465, 470 providing the input thereto, to establish a D.C. output representative of the integral of antenna heading errors derived from the Directional Unit. This D.C. signal is then fed to an electrometer and follower circuit comprising electrometer 475, cathode follower 480, and constant current source 485, very similar to the electrometer and memory circuit of the Tracking Unit, to provide a D.C. output at 500, 501 suitable for summation with the missile off-target heading signals, derived from the difference in headings between antenna and missile, and thus supply the desired collision course or lead intelligence to the autopilot.

In the operation of the present control system, when the missile trajectory is initially a pursuit course against a moving target, under stable conditions of target course and speed, missile speed, wind velocity and direction, etc., the output of the Directional Unit is continually unbalanced in one direction calling for continual corrections of antenna headings in that direction. Upon initiation of Integrator Unit action, by means to be subsequently considered, the unbalance in Directional Unit output is integrated to provide an Integrator Unit output calling for missile heading changes in the same direction as those required by the effect of the Directional Unit output on the antenna, and additive thereto. As the missile is thus compelled by its autopilot, responding to the sum of these outputs, to swing into a course somewhat between a pursuit course and a collision course, the Directional Unit output remains unbalanced in the same direction but to a lesser degree, causing the Integrator Unit output to increase (although by a lesser amount), and thus calling for increased lead in the missile heading. Eventually, as this action continues, the output of the Directional Unit becomes and remains substantially balanced, indicating a substantially constant angle of sight to the target; the output of the Integrator Unit then remains substantially constant at the level attained during the transition period, and the missile is on substantially a collision course with the target; for by well known principles of geometry, navigation, and fire control, if the line of sight from missile to target were in fact held constant, the missile would be on a true collision course with the target. Since the antenna is slaved by the control system to an on-target heading, it is now looking in the opposite direction with respect to the missile axis from the direction of missile heading corrections it required during pursuit course; consequently, the sign of the signal resulting from missile and antenna heading discrepancies is reversed from that obtained during pursuit course. Therefore, although the antenna derived missile heading signals and Integrator Unit output were initially additive, the sign inversion places them now in opposition; and if the circuit constants are properly chosen, they would be equal in magnitude at a true collision course causing the missile to fly a substantially straight line along the collision course thus established, an ideal situation which is approached but seldom actually attained.

Turning now to a detailed consideration of an Integrator Unit circuit embodiment, reference is had to the detailed wiring diagram FIG. 12. As there shown, the range pulses R obtained from the Tracking Unit through channel 74 are coupled to the grid of the gated current triode 450 through the capacitor 451 and across the resistor 452, to provide inverted or negative going pulses AAA on the cathodes of the remodulation amplifiers 455 and 460. At the same time, the plate potentials from the left and right commutator triodes 330 and 340 of the Directional Unit, as impressed across capacitors 331 and 332, are directly and continuously applied to the control grids of the remodulation amplifiers 455 and 460 through channels 331a and 332a, respectively. Due to the modulation effect thus had by pulses AAA on the D.C. commutator plate potentials, pulse outputs represented by BBB and CCC are obtained on the plates of these remodulation amplifiers, whose amplitudes are controlled by their respective instantaneous commutator plate potentials.

The pulses BBB and CCC are differentiated into wave forms DDD and EEE in their application to the cathode circuits of the integrator diodes 465 and 470 through capacitors 456 and 461. These two integrator diodes function in substantially the same manner as the feeder diodes 400 and 405 of the Tracking Unit. Both diodes are back biased and these back biases are boot-strapped to the Integrator Unit output, diode 465 being back biased through a relatively negative potential applied to its plate as obtained from the cathode circuit of follower 480, and diode 470 being back biased by the application of a relatively positive potential to its cathode obtained from a more positive point in the cathode circuit of follower 480, with an additional positive back bias obtained through the channel 471 in the plate circuit of said follower, thereby providing equal and boot-strapped back biases on these two integrator diodes. In the application of wave forms DDD to the integrator diode 465, those portions of the negative going pulses thereof which exceed the diode back bias are passed through the diode and effectively removed by the large capacitor 466, the remaining portions of said pulses being coupled to the integrating capacitor 468 through the resistor 467, while the complete positive going pulses are applied to the integrating capacitor. On the other hand, when the wave forms EEE are applied to the integrator diode 470, those portions of the negative going pulses thereof which exceed the back bias are passed through the integrator diode 470 to the integrating capacitor 468, while the positive going pulses thereof are removed by the back bias sources for this diode. As a result of the action of these integrator diodes, it is apparent that the charge obtained across the integrating capacitor 468 represents the integral of required changes in antenna heading, as indicated by the unbalance in the Directional Unit output and the resultant relative magnitudes of the remodulation amplifier outputs BBB and CCC. Since one side of the capacitor 468 is tied to ground, the voltage drop across this capacitor, as established by the action of the integrator diodes in response to the integrator input signals, is represented entirely by the potential level on the other side of this capacitor, it being in turn tied to the suppressor grid of the electrometer pentode 475.

It is to be noted that the circuitry interrelating the electrometer pentode 475 and the integrator cathode follower triode 480 is substantially identical to that provided in the electrometer and memory circuit of the Tracking Unit described above, and hence a voltage is obtained at point 481 controlled in magnitude by the potential drop established across the integrating capacitor 468. In this electrometer and follower circuit, as in the one contained in the Tracking Unit: the plate of the electrometer is tied to the cathode of the follower triode; the cathode of the electrometer is tied to the grid of the follower triode; the control grid of the electrometer is electrically removed from the circuit by being tied to the cathode thereof; the screen grid of the pentode is tied through a relatively large resistor 476 to a point in the circuit which, as will be subsequently shown, varies in potential in accordance with the electrometer cathode potential level, providing a fixed screen grid to cathode potential drop, and hence a fixed screen grid current; the plate of the follower triode is tied to the same point as the screen grid of the electrometer, thereby providing a fixed plate to grid potential difference in this tube; and since the cathode circuit of the follower is designed to provide cathode follower action, the plate to cathode potential drop thereof is likewise fixed. In the instant electrometer and follower circuit, however, the constant follower cathode current, which is necessitated by the desired action of the electrometer and follower circuit, is afforded by the constant current source pentode 485, rather than in the manner utilized in the electrometer and memory circuit of the Tracking Unit in order that a higher order of accuracy may be obtained by the present Unit, and no rate memory is here provided.

In the operation of this electrometer and follower circuit, the potential drop across the capacitor 468 is applied to the suppressor grid of the electrometer pentode 475, providing a high input impedance for the electrometer and memory circuit, which results in a corresponding change in the cathode potential thereof and hence in the potential level of the grid and cathode of the cathode follower triode 480, and consequently, in corresponding changes in the potential level of the electrometer plate. The point 481 of the electrometer and memory circuit (directly tied to the cathode of follower 480) is thus established at a potential level determined by the charge on or potential drop across the capacitor 468, and varies in accordance therewith to provide a voltage output representing the integral of antenna heading corrections required from that point in the missile's flight at which integrator action is initiated. In addition to the voltage output obtained at point 481, changes in the plate potential level of the constant current source pentode 485 are inverted in the D.C. inverter triode 490 by tying the plate of the current source pentode to the control grid of triode 490, to provide at point 491 (directly tied to the plate of inverter 490) potentials equal to but opposite in polarity from the potentials obtained at point 481, thereby obtaining a push-pull output across the Integrator Unit output taps 500 and 501. As is apparent, however, a single ended output may be here provided when desired. The Integrator Unit output obtained across the taps 500 and 501 is applied to the missile's autopilot by summation with the missile-heading-to-antenna-heading discrepancy signal in any desired manner, as will be apparent to those skilled in the art, to provide the desired proportional navigation.

It is to be further noted that the plate potentials of D.C. inverter triode 490, which are the potentials obtained at point 491, are coupled to the grid of plate compensator triode 495, to provide a reinverted output in the plate circuit thereof in accordance with variations in the integrator output obtained at points 491 and 501. Since the plate of plate compensator triode 495 is coupled to the plate of the integrator cathode follower triode 480, and through resistor 476 to the screen grid of electrometer pentode 475, there is thus obtained the previously mentioned constant potential difference between the potential source of the electrometer screen grid and the electrometer cathode, and the cathode follower plate and its control grid or cathode.

Since in the specific embodiment here described, it is contemplated that the missile follow a pursuit course over a large portion of its trajectory and utilize proportional navigation effecting the mentioned substantial collision course over only that portion of its air flight trajectory commencing with 5 mile target range, as determined by the previously described 5 mile relay and switch circuit in the Range Switching Unit, the switch 510 is provided in the Integrator Unit which connects to a suitable fixed voltage source. During pursuit navigation the switch 510 is closed to contact 510a, fixing the potential drop across capacitor 468 regardless of antenna error signals obtained through the integrator diodes 465 and 470. This fixed potential source for switch 510 is so chosen that in the specific circuit employed it is of that value which obtains zero output across the integrator output taps 500 and 501. However, after excitation of the 5 mile integrator relay 174 in the Range Switching Unit, switch 510 being controlled thereby is forced out of engagement with contact 510a and into engagement with the other contact 510b, thereby disconnecting capacitor 468 from the fixed voltage source and making it responsive to all antenna error signals obtained through the integrator diodes 465 and 470, to provide the proper Integrator Unit output across the output taps 500 and 501 for obtaining the desired proportional navigation of the missile.

Conclusion

In utilizing a guided missile containing a control system as hereinabove described, together with a suitable adjunctive radar system and autopilot, it is contemplated that the missile be launched from a mother craft, such as an aircraft, a naval vessel, or a land installation. Prior to launching, a target within the missile's radar range is first selected for the missile, and the Tracking Unit is locked onto this target with the aid of a monitor. The monitor comprises preferably an oscilloscope for presenting the information derived from the control system in visual form to an observed. For this purpose, the pretrigger pulses K obtained at output tap 51 (FIG. 3) may be utilized to synchronize the oscilloscope's range sweep circuit with the transmission of radar pulses, to effect, for example, a horizontal sweep of the cathode ray tube beam; while the mixed video output GGG at tap 243 (FIG. 4), carrying the received echo pattern FFF and marker step LL, may be utilized to deflect the beam sweep, for example, in the vertical direction. By this presentation an observer may determine what targets are present in the radar system's field of vision and where each is located. By adjustment of the slew voltage applied to switch contact 430a (FIG. 9) he may vary the time relationship of the tracking gates to the pretrigger until they are positioned to sandwich in time the echo pulses of a desired target, as indicated on the oscilloscope by the marker step. Thereupon, the slew switch 430 (FIG. 9) may be thrown by the slew relay 430c (FIG. 9) into automatic tracking position to enable the automatic operation of the control system as described above. If desired, the observer may continue to watch the automatic tracking action thereby presented on the oscilloscope for a period of time prior to launching, to determine if the control system is functioning properly and tracking the desired target. The missile may then be launched, severing all connection with the mother craft or installation, and propelled on its homing course by any suitable power means desired.

Summarizing the operation of the present control system while automatically directing the missile on its homing flight, it controls the repetition frequency and timing of the radar system's pulse transmissions, and with the time base thus established tracks the selected target in range by continually measuring the time interval between each radar pulse transmission and the reception of the resultant selected target radar echo pulse, the range measurement thus established being adjusted into accurate time relationship to the selected target echo pulse during each radar repetition cycle. The selected target being thus identified by the control system, each pattern of received radar echo pulses, when used to obtain directional information, is gated in accordance with the range measurements to select that echo signal derived from the selected target. The thus selected echo signal from each radar repetition cycle is then commutated in accordance with the particular radar scan employed, the powers of the commutated echo pulses are averaged and compared to determine selected target bearing, and the information thus derived is utilized through an autopilot to direct the missile onto an on-target course, and thus effect pursuit navigation homing of the missile to the target.

The present control system can additionally function, when desired, to direct the missile onto substantially a collision course with the target. This is essentially accomplished by integrating the required changes in missile heading over a period of time (preferably exclusive of those resulting from transient missile instability) derived from the target bearing information, and adding this integral to the direct target bearing information to insert the appropriate lead into the missile heading over the course coincident with target bearing.

Also, desired missile functions or operations may be programmed into the control system by being keyed to predetermined missile to target ranges. The control system may generate a number of fixed time standards in desired time relationship with the transmission of each radar pulse, which represent extents of time within the radar repetition cycle representative of desired ranges. The time phases of these standards may then be compared in each radar cycle with the determination of actual target range by the control system, and as the target range determination moves into coincidence with the several standards, the desired missile functions or operations keyed to these ranges are triggered into being.

The above-described and illustrated detailed circuitry presents one specific embodiment of a homing guided missile control system embodying the features of the present invention. The values and types of the circuit components are appropriately indicated in the detailed circuit drawings to present one complete embodiment operative for the purposes described. The disclosure here presented is, however, merely exemplary of the present invention and it is not intended that the present invention be construed as limited thereto; for modifications of the embodiment here presented to suit the functions and tasks desired of various guided missiles will be apparent to those skilled in the art, and such modifications as are within the spirit and scope of the appended claims are within the purview of the present patent.

What is claimed is:

1. A control system, for a guided missile having means for sensing the presence of a target and producing signals in response thereto, comprising a trigger unit for cyclically producing a time base pulse and a tracking trigger in fixed time phase relationship, a range tracking unit operating cyclically in response to said tracking triggers to track by time discrimination a preselected signal from a group of time displaced signals obtained from said sensing means and representative of a plurality of targets at different ranges, said tracking unit accomplishing said tracking function by producing a range trigger and a range pulse each being continually adjusted during each cycle of operation by the tracking unit into a respectively chosen fixed phase relationship with said preselected target signal through phase comparison means, a selector unit operating to time gate said group of signals by phase coincidence measuring means controlled by said range trigger to select that signal being tracked by the tracking unit, a directional unit for effecting a spatial scan by the sensing means, commutating the selected signals in accordance with said spatial scan, and for comparing the powers of thus commutated selected signals to derive selected target bearing information relative to the missile, an integrator unit for integrating changes in selected target bearing information over a period of time and thereby deriving an appropriate lead angle for placing the missile on substantially a collision course with the target, a range unit operating in response to each time base pulse to produce a pulse of chosen time duration and continually comparing the phase of the chosen duration pulse with said range pulse, and means responsive to phase coincidence between a latter time portion of said chosen duration pulse and an early time portion of said range pulse to activate said integrator unit, thereby enabling the missile to home on a selected target along a pursuit course over a desired portion of its trajectory and along substantially a collision course over another desired portion of its trajectory.

2. A control system, for a guided missile having means for sensing the presence of a target and producing signals in response thereto, comprising a trigger unit for cyclically producing a time base pulse and a tracking trigger in fixed time phase relationship, a range tracking unit operating cyclically in response to said tracking triggers to track by time discrimination a preselected signal from a group of time displaced signals obtained from said sensing means and representative of a plurality of targets at different ranges, said tracking unit accomplishing said tracking function by producing a range trigger and a range pulse each being continually adjusted during each cycle of operation by the tracking unit into a respectively chosen fixed phase relationship with said preselected target signal, a selector unit operating to time gate said group of signals as controlled by said range trigger to select that signal being tracked by the tracking unit, a directional unit for effecting a spatial scan by the sensing means and for comparing the powers of selected signals to derive selected target bearing information relative to the missile, an integrator unit for deriving from changes in selected target bearing information an appropriate lead angle for placing the missile on substantially a collision course with the target, a range unit operating in response to each time base pulse to produce a pulse of chosen time duration and continually comparing the phase of the chosen duration pulse with said range pulse, and means responsive to phase coincidence between said chosen duration pulse and range pulse to activate said integrator unit, thereby enabling the missile to home on a selected target along a pursuit course over a desired portion of its trajectory and along substantially a collision course over another desired portion of its trajectory.

3. A control system, for a guided missile having means for sensing the presence of a target and producing signals in response thereto, comprising cyclically operating means for tracking by time discrimination a preselected signal from a group of time displaced signals obtained from said sensing means and representative of a plurality of targets at different ranges, said tracking means accomplishing said tracking function by producing a range trigger and a range pulse each being continually adjusted during each cycle of operation by the tracking means into a respectively chosen fixed phase relationship with said preselected target signal, means operating to time gate said group of signals as controlled by said range trigger to select that signal being tracked by the tracking means, means for effecting a spatial scan by the sensing means and for comparing the powers of selected signals to derive selected target bearing information relative to the missile, means for deriving from changes in selected target bearing information an appropriate lead angle for placing the missile on substantially a collision course with the target, means operating cyclically in keyed relation to said tracking means to produce a pulse of chosen time duration and continually comparing the phase of the chosen duration pulse with said range pulse, and means responsive to phase coincidence between said chosen duration pulse and range pulse to activate said lead means, thereby enabling the missile to home on a selected target along a pursuit course over a desired portion of its trajectory and along substantially a collision course over another desired portion of its trajectory.

4. A control system, for a guided missile having means for sensing the presence of a target and producing signals in response thereto, comprising means for range tracking a preselected signal from a group of time displaced signals obtained from said sensing means and representative of a plurality of targets at different ranges, means for selecting from said group of signals that signal being tracked by the tracking means, means for effecting a spatial scan by the sensing means and for deriving from the selected signals selected target bearing information relative to the missile, means for deriving from changes in selected target bearing information an appropriate lead angle for placing the missile onto substantially a collison course with the target, means operating in keyed relationship to said tracking means for activating said lead means at a preset target range, thereby enabling the missile to home on a selected target along a pursuit course over a desired portion of its trajectory and along substantially a collision course over another desired portion of its trajectory.

5. A control system, for a guided missile having means for sensing the presence of a target and producing signals in response thereto, comprising a trigger unit for cyclically producing a time base pulse and a tracking trigger in fixed time phase relationship, a range tracking unit operating cyclically in response to said tracking triggers to track by time discrimination a preselected signal from a group of time displaced signals obtained from said sensing means and representative of a plurality of targets at different ranges, said tracking unit accomplishing said tracking function by producing a range pulse continually adjusted during each cycle of operation by the tracking unit into a chosen fixed phase relationship with said preselected target signal through phase comparison means, a range switching unit operating in response to each time base pulse to produce a plurality of pulses of different chosen time durations and continually comparing the phases of the chosen duration pulses with said range pulse, and means responsive to phase coincidence of an early time portion of said range pulse with a latter time portion of each chosen duration pulse to effect predetermined operations in and by the missile, thereby enabling the programing of said operations in accordance with target range.

6. A control system, for a guided missile having means for sensing the presence of a target and producing signals in response thereto, comprising a trigger unit for cyclically producing a time base pulse and a tracking trigger in fixed time phase relationship, a range tracking unit operating cyclically in response to said tracking triggers to track by time discrimination a preselected signal from a group of time displaced signals obtained from said sensing means and representative of a plurality of targets at different ranges, said tracking unit accomplishing said tracking function by producing a range pulse continually adjusted during each cycle of operation by the tracking unit into a chosen fixed phase relationship with said preselected target signal, a range switching unit operating in response to each time base pulse to produce a plurality of pulses of different chosen time durations and continually comparing the phases of the chosen duration pulses with said range pulse, and means responsive to phase coincidence of said range pulse with each chosen duration pulse to effect predetermined operations in and by the missile, thereby enabling the programing of said operations in accordance with target range.

7. A control system, for a guided missile having means for sensing the presence of a target and producing signals in response thereto, comprising cyclically operating means for tracking by time discrimination a preselected signal from a group of time displaced signals obtained from said sensing means and representative of a plurality of targets at different ranges, said tracking means accomplishing said tracking function by producing a range pulse continually adjusted during each cycle of operation by the tracking means into a chosen fixed relationship with said preselected target signal, means operating cyclically in keyed relation to said tracking means to produce a plurality of pulses of different chosen time durations and continually comparing the phases of the chosen duration pulses with said range pulse, and means responsive to phase coincidence of said range pulse with each chosen duration pulse to effect predetermined operations in and by the missile, thereby enabling the programing of said operations in accordance with target range.

8. A control system, for a guided missile having means for sensing the presence of a target and producing signals in response thereto, comprising cyclically operating means for tracking a preselected signal from a group of time displaced signals obtained from said sensing means and representative of a plurality of targets at different ranges, said tracking means thereby producing a range pulse continually adjusted during each cycle of operation into a chosen fixed phase relationship with said preselected target signal, means operating cyclically in keyed relation to said tracking means for producing a pulse of a chosen time interval standard and continually comparing the time phase of said range pulse therewith, and means for effecting a predetermined operation in and by the missile upon the range pulse obtaining a time phase represented by the standard, thereby enabling the programing of said operation in accordance with target range.

References Cited in the file of this patent

UNITED STATES PATENTS

| | | |
|---|---|---|
| 2,503,835 | Montgomery | Apr. 11, 1950 |
| 2,516,356 | Tull | July 25, 1950 |
| 2,569,485 | McLennan | Oct. 2, 1951 |
| 2,612,605 | Ranks | Sept. 30, 1952 |
| 2,629,827 | Eckert | Feb. 24, 1953 |